United States Patent [19]
Fujikawa et al.

[11] Patent Number: 5,313,487
[45] Date of Patent: May 17, 1994

[54] DISCHARGE EXCITATION GAS LASER APPARATUS

[75] Inventors: Shuichi Fujikawa; Mitsuo Inoue; Yukio Sato; Haruhiko Nagai, all of Amagasaki, Japan

[73] Assignee: Mitsubishi Denki Kabushiki Kaisha, Tokyo, Japan

[21] Appl. No.: 887,770

[22] Filed: May 22, 1992

[30] Foreign Application Priority Data

May 23, 1991 [JP] Japan .................................. 3-118513
Oct. 7, 1991 [JP] Japan .................................. 3-258944

[51] Int. Cl.$^5$ ............................................ H01S 3/097
[52] U.S. Cl. .......................................... 372/86; 372/38; 372/87; 372/82
[58] Field of Search ................. 372/86, 87; 373/82, 373/38

[56] References Cited

U.S. PATENT DOCUMENTS

| | | | |
|---|---|---|---|
| 4,611,327 | 9/1986 | Clark et al. | 372/86 |
| 4,837,773 | 6/1989 | Wakata et al. | 372/86 |
| 5,890,021 | 2/1992 | Nakatani et al. | 372/86 |

FOREIGN PATENT DOCUMENTS 222183 8/1990 Japan .
268476 9/1990 Japan .

*Primary Examiner*—Léon Scott, Jr.
*Attorney, Agent, or Firm*—Sughrue, Mion, Zinn, Macpeak & Seas

[57] ABSTRACT

At least two types of preionization systems are provided at a backside of one of a pair of primary electrodes which are disposed in a spaced opposed relation with respect to each other for causing a large area, spatially uniform main discharge in a laser gas therebetween. This improves efficiency and stability in laser oscillations under repeated operations at a high rate of tens to hundreds of shots per second. In addition, without using the laser output power, the preionization timing is controlled such that an optimal preionization timing is realized. The optimal preionization timing is determined on the basis of a minimum discharge starting voltage between the primary electrodes or a minimum required time from the time of applying a high voltage between said first and second primary electrodes until the time the main discharge commences.

16 Claims, 15 Drawing Sheets

DISCHARGE EXCITATION GAS LASER APPARATUS

BACKGROUND OF THE INVENTION

The present invention relates to a discharge excitation gas laser apparatus, and more particularly, to one having a preionization means for preionizing a laser gas.

In order to effectively excite through electronic discharge a gaseous medium at a pressure equal to or higher than the atmospheric pressure in a gas layer apparatus, it is necessary to produce a spatially uniform glow discharge. To this end, it is general practice to perform preionization for producing a multitude of electrons in a main or major discharge space prior to the start of a main or major discharge. In this case, to increase the output power of the discharge excitation gas laser apparatus, it is an effective measure to increase a cross-sectional area of a major discharge space. Thus, there have hitherto been proposed gas laser apparatuses having special preionization means for achieving a uniform discharge in a space having a large cross-sectional area. A typical example of this kind of discharge excitation gas laser apparatus is disclosed, for example, in Japanese Patent Laid-Open No. 2-268476. FIG. 13 illustrates an electrodes structure of this apparatus in which a first primary electrode 301 is disposed in a spaced parallel relation with a second primary electrode 302 which is formed of a flat metal plate or board having a plurality of throughholes formed therein. A secondary or auxiliary electrode 303 is disposed at the backside of the second primary electrode 302 with a dielectric member 304 inserted between or sandwiched by them. A plurality of pairs of first and second pin electrodes 305, 306 are disposed at and outside the opposite ends of the first primary electrode 301. Each of the second pin electrodes 306 having an L-shaped cross section is disposed outside and in a face-to-face relation with a corresponding first pin electrode 305 with a limited amount of sparking gap formed therebetween.

The operation of the above-mentioned conventional electrodes arrangement will now be described below. First, let us assume that in FIG. 13, the direction perpendicular to the surface of this figure is the direction of an axis of light and that a resonator for generating a laser beam is provided which comprises a partial reflection mirror and a total reflection mirror disposed before and after the first and second primary electrodes 301, 302 in the direction of the axis of light. Though not illustrated, the first and second primary electrodes 301, 302 are connected to an exciting circuit so that when a high voltage is applied across the first and second primary electrodes 301, 302 by means of the exciting circuit, a discharge is caused therebetween to excite a laser gas lying therebetween.

In this regard, a referred to above, it is significant for a discharge excitation gas laser apparatus, which normally operates at a pressure equal to or greater than the atmospheric pressure, to preionize a laser gas used therein. A major feature of this type of gas laser apparatus is that the apparatus includes a first preionization means using a UV spark type preionization system disposed at one side of the first primary electrode 301, and a second preionization means using a corona type preionization system disposed at the other side of the first primary electrode 301. The first preionization means functions to generate a high voltage between the first and second pin electrodes 305, 306 to cause arc discharges whereby ultra violet rays are generated to preionize the laser gas between the first and second primary electrodes 301, 302. The second preionization means functions to generate a high voltage between the secondary electrode 303 and the second primary electrode 302 to cause corona discharges in the respective throughholes in the second primary electrode 302 whereby ultra violet rays are generated to preionize the laser gas between the first and second primary electrodes 301, 302.

In order to efficiently excite the laser gas through discharging, it is necessary to generate a uniform glow discharge, as previously described. In this regard, there is a close relation between the uniform discharge, the density of the preionized electrons and the uniformity in the distribution of density of preionized electrons. Thus, with the UV spark type preionization system, the laser gas is preionized by use of strong ultra violet rays generated by arc discharges, so that a high density of preionized electrons is obtained. In this case, however, it the distances between the paired pin electrodes, which are disposed in a spaced face-to-face relation on the opposite ends of the first primary electrode 301 and act as light sources, are too great, a steep slope will develop in the distribution of preionized electrons density due to the distance dependency of ultra violet rays, so uniform discharge will no longer be generated. In general, with this type of preionization system, since the paired pin electrodes acting as sources for generating ultra violet rays are disposed on the opposite sides of the primary electrodes, the width of length of a main or major discharge is limited for the reasons as referred to above. On the other hand, with the corona type preionization system, preionization is generally performed from the backside of the second primary electrode 302, so uniform distribution of preionized electron density is obtained with respect to the direction perpendicular to the electric field applied for causing a main or major discharge. As a result, the width or length of the primary discharge is not limited. In order to provide a high density of preionized electrons by use of the corona preionization system, it is necessary to increase the density of current for charging a corona preionization capacitor which is formed by the second primary electrode 302, the secondary electrode 303 and the dielectric member 304. The density of current charging the corona preionization capacitor is proportional to the electrostatic capacity of the capacitor as well as the rising speed (i.e., dV/dt) of the voltage applied thereacross. Assuming that the areas of the electrodes are constant for the purpose of increasing the current density, increasing the electrostatic capacity requires that the dielectric member 304 is formed of a material having a high dielectric constant or that the distance between the second primary electrode 302 and the secondary electrode 303 is short. However, the dielectric materials usable for the preionization dielectric member 304 are limited due to a high dielectric break-down voltage which they should have, so the distance between the electrodes 302, 303 can not be reduced to such an extent as required. Thus, it is also difficult to increase the electrostatic capacity of the preionization capacitor. In addition, the rising rate or speed of the voltage applied between the electrodes 302, 303 is limited by the inductance determined by the arrangement or construction of the electrodes, so it is difficult to increase the density of charging current supplied to the preionization capacitor to such an extent as required for providing a high density of preionized electrons by use of the corona type preionization systems. Accordingly, with the above-described conventional electrodes construction having both of the UV discharge type and corona type preionization systems, it is substantially impossible to provide a uniform and high preionization density over an area having a relatively large cross section in a relatively simple manner.

Moreover, since the discharge excitation type gas laser apparatus as described above is of the pulse oscillation type, it is essential to perform repeated operations at such a high rate as from tens to hundreds of shots per second from the point of view of industrial utilization. To enable such repeated operations in a stable manner, impurities such as charged particles produced by main or major discharges have to be removed from the discharging space or vicinity. To this end, the laser gas is generally circulated to facilitate replacement of the used laser gas in the discharging region from one side of the primary electrodes for every discharge. In this case, however, if major discharges are repeated at a rate of more than hundreds of shots per second, circulation of the laser gas has to be performed at a high speed. Accordingly, if there are obstacles such as pin electrodes disposed at one side or both sides of the primary electrodes, vertical flows will develop, thus disturbing the circulating flow of the laser gas. Further, since a lot of impurities are produced by arc discharges and flow into the discharging vicinity, it is impossible to effect sufficient laser gas replacement. As a result, uniform major discharge can not be obtained, reducing the life span of the laser gas.

With the above-mentioned conventional gas laser apparatus in which the preionization sources are disposed on the opposite sides of the first and second primary electrodes 301, 302, the overall construction of the electrodes becomes complicated and hence disadvantageous in lowering the inductance of the main discharge circuit, which is essential for efficient excitation, thus requiring considerable labor in assembly and maintenance of the apparatus.

FIG. 14 shows another conventional discharge excitation type gas laser apparatus, disclosed, for example, in Japanese Patent Laid-Open No. 2-222183. In FIG. 14, the apparatus illustrated includes, in addition to an arc discharge means in the form of paired pin electrodes 405, 406, a corona discharge means in the form of a second primary electrode 402, a secondary or auxiliary electrode 403 and a dielectric member 404, all of which are the same as the corresponding elements 302 through 306 in FIG. 13. It also includes a shunt reactor 407 for equally distributing flows of current among a plurality of pin electrodes 405, 406, a peaking capacitor 408 and a pulsed power source 409. In this case, however, the pin electrodes 405, 406 are disposed, instead of at the opposite sides of the first primary electrode as in FIG. 13, at the backside of the second primary electrode 402. Therefore, the pin electrodes 405, 406 have no adverse effects on laser gas circulation. In this regard, it is to be noted that the pin electrodes 405, 406 are not for preionization but for speeding up the rising of a voltage generated upon corona discharge.

Specifically, as described before, increasing the charging current supplied to a corona preionization capacitor comprising the second primary electrode 402, the secondary electrode 403 and the dielectric member 404 provides an increased density of preionized electrons. In the apparatus of FIG. 14, the preionization capacitor and the peaking capacitor 408 are connected in series to each other. In general, the capacity of the preionization capacitor is much less than that of the peaking capacitor 408, so almost all of the voltage generated by the pulsed power source 409 is applied to the preionization capacitor. For this reason, as compared with usual parallel connection of the preionization capacitor and the peaking capacitor 408, the serial connection of these capacitors provides a very fast rising of a voltage applied to the preionization capacitor and hence an accordingly increased charging current. In this manner, the pin electrodes 405, 406 of the conventional apparatus of FIG. 14 generates a voltage of a fast rising rate between the second primary electrode 402 and the secondary or auxiliary electrode 403 but does not perform preionization.

In summary, the above-described conventional discharge excitation gas laser apparatuses employ a plurality of preionization systems for preionizing a laser gas in a discharge excitation space so as to achieve a large area discharge. In these gas laser apparatuses, a plurality of preionization means are disposed at such locations as interrupt portions of the circulating flows of the laser gas, as illustrated in FIG. 13, endering it difficult to obtain uniform discharge in a stable manner during repeated operations of the apparatus, as would be the case in industrial applications. Additionally, in either examples as illustrated in FIGS. 13 and 14, preionization means are disposed at locations adjacent the opposite sides of the first and second primary electrodes, thus rendering the overall electrodes construction relatively complicated. This not only prevents lowering of the inductance of the discharge loop or circuit, which is needed for highly efficient laser oscillation, but also requires considerable labor for maintenance.

Further, FIG. 15 illustrates a conventional excitation circuit in a discharge excitation pulsed laser apparatus as disclosed, for example, in a reference entitled "Excimer Laser Developments and Application Techniques" by Shuntaro Watanabe, Page 17. This excitation circuit is generally called a capacity transfer type excitation circuit which includes a pair of first and second primary electrodes 501, 502 disposed in a spaced parallel relation, a power supply terminal 503 for supplying electric power to the excitation circuit, a storage capacitor 504, a plurality of peaking capacitors 505, a switch 506, a charging coil 507, and a plurality of pairs of preionization pin electrodes 508 disposed on the opposite sides of the electrodes 501, 502.

In operation, a high voltage is first imposed on the power supply terminal 503 to charge the storage capacitor 504 through the charging coil 507. When the switch 506 is turned on, a voltage equal to the charged voltage of the storage capacitor 504 is imposed across the charging coil 507 and between the preionization pin electrodes 508. Since the charged voltage of the storage capacitor 504 is sufficiently higher than a dielectric break-down voltage between the opposed preionization pin electrodes 508, arc discharges are caused between the opposed pin electrodes 508, generating ultra violet rays which preionize a laser gas in a major discharge space defined between the first and second primary electrodes 501, 502. In this manner, ionized electron seeds are uniformly generated in the major discharge space. As arc discharge begins to develop, a gap between each pair of opposed pin electrodes 508 becomes conductive, forming a closed circuit comprising the storage capacitor 504, the peaking capacitor 505, the switch 506 and the opposed pin electrodes 508. The inductance of the closed circuit is set to be far less than the inductance of the charging coil 507, so charged electrons stored in the storage capacitor 504 transfer to the peaking capacitor 505, rapidly charging it. When the charged voltage across the peaking capacitor 505, which is equal to the voltage applied between the first and second primary electrodes 501, 502, reaches the dielectric break-down voltage across the primary electrodes 501, 502, major discharge initiates from the charged electron seeds. Upon initiation of the major discharge, charged electrons stored in the peaking capacitor 505 begin to rapidly rush into the major discharge space between the primary electrodes 501, 502 to thereby excite the laser gas therein.

The apparatus of FIG. 15 is called an automatic preionization type in which a preionization circuit for applying a high voltage between the opposed pin electrodes 508 is incorporated in the excitation circuit so that preionization and major discharge are automatically carried out in suitable timing upon energization of the excitation circuit. The automatic preionization system is simple in construction and inexpensive to manufacture, so it has become popular and been widely employed with a laser apparatus for industrial applications.

FIG. 16 shows a further conventional discharge excitation gas laser apparatus utilizing X rays for preionization, as disclosed, for example, in a reference entitled "X-Ray Preionization of Rare-Gas-Halide Lasers", by K. Midorikawa et al, IEEE J. Quantum Electron. QE-20, NO 3, P198, 1984. In this figure, a pair of first and second primary electrodes 601, 602 are disposed in a spaced parallel relation with respect to each other, as in the apparatuses of FIGS. 13 and 14. A pulse forming line 609, which is charged by a pulsed charger 610, has an impedance matching that of a major discharge space, which is defined between the first and second primary electrodes 601, 602, for storing energy to be supplied to the major discharge space. A switch in the form of a railgap 611 switches the connection between the pulse shaping passage 609 and the first primary electrode 601 on and off. The apparatus further includes an X-ray generator 612 for generating X rays toward the major discharge space or gap between the first and second primary electrodes 601, 602. It also includes a Marx generator 613 for applying a high voltage to the X-ray generator 612, a trigger generator 614 for generating a trigger signal to the Marx generator 613 and the pulsed charger 610 to trigger them, and a delay circuit 615 connected between the trigger generator 614 and the pulsed charger 610 for supplying the trigger signal from the trigger generator 614 to the pulsed charger 610 at delayed timing. The timing of preionization and the timing of major discharge are determined by the trigger generator 614 and the delay circuit 615.

The operation of the above apparatus will be described below. First, the trigger generator 614 concurrently generates two reference signals, one of which is fed to the Marx generator 613 whereupon it generates a high voltage to the X-ray generator 612. The X-ray generator 612 generates X rays which are radiated on the laser gas between the first and second primary electrodes 601, 602 to preionize the same. On the other hand, the other of the two reference signals is fed to the delay circuit 615 and thence to the pulse charger 610 with a prescribed time delay which is set by the delay circuit 615, whereby the pulse forming line 609 is charged by the pulsed charger 610. When the charged voltage of the pulse forming line 609 exceeds a dielectric break-down voltage between opposed pin electrodes in the railgap 611, a plurality of arc discharges take place between the railgap electrodes, thereby performing switching operation. Simultaneous with the start of the switching operation of the railgap 611, the voltage imposed on the first primary electrode 601 begins to increase rapidly. When the voltage applied to the first primary electrode 601 exceeds the dielectric break-down voltage between the first and second primary electrodes 601, 602, a primary or major discharge therebetween starts. At this moment, the energy stored in the pulse forming line 609 is released or discharged into the major discharge space between the first and second primary electrodes 601, 602 to excite the laser gas therein.

FIG. 17 illustrates, in a graphical representation, the preionization timing dependency of the laser output as disclosed in a reference entitled "Parametric Study of X-Ray Preionized High-Pressure Rare Gas Halide Lasers", by M. Steyer and H. Vogas, Appl. Phys. B42, P155-160, 1987. In this graph, the abscissa represents the preionization timing which is given by a length of time elapsed from the start of X-ray radiation until the time when the laser pulse reaches a peak value, and the ordinate represents the laser output. From this graph, it can be seen that the laser output greatly depends on the preionization timing, so there exists an optimal timing for preionization. FIG. 18 graphically illustrates the result of measurements in which the optimal value for the preionization timing is plotted against the charged voltage of the primary capacitor in the excitation circuit. FIG. 19 graphically illustrates the result of measurements in which the optimal value for the preionization timing is plotted against the concentration of krypton in the laser gas composition. From FIGS. 18 and 19, it can be seen that the optimal value for the preionization varies in accordance with the operating conditions of the laser apparatus such as the composition of the laser gas, the method of applying a voltage between the first and second primary electrodes 601, 602 and the like.

In the preionization system as illustrated in FIG. 15, the preionization timing is automatically determined by a circuit constant such as the circuit inductance, which is determined by the capacitance and structure of the capacitor, and the like. Though the optimal timing for preionization varies according to the laser operating condition of the apparatus as referred to above, changing the preionization timing in the preionization system of FIG. 15 requires a change in the circuit constant, so it is quite difficult to always maintain the preionization timing at an optimal timing irrespective of the laser operating condition of the apparatus. On the other hand, with the conventional apparatus of FIG. 16, the circuit for major discharge and the circuit for preionization are formed separately and independently of each other, and the timing for major discharge and the timing for preionization are properly controlled by means of the delay circuit 615, but no independent setting of preionization timing is carried out. That is, the preionization timing dependency of the laser output power is measured to find an optimal preionization timing at which the laser output power becomes the greatest, and a delay time is set to provide the optimal preionization timing.

In order to use a discharge excitation pulse laser apparatus for industrial applications, it is essential for the laser apparatus to continuously operate for an extended period of time, as referred to above. During continued operation of the apparatus, the laser operating condition of the apparatus varies with time because gradually increasing degradation of the laser gas, thus resulting in a gradual change in the optimal timing of preionization. With the above-mentioned conventional apparatus, however, the preionization timing is fixedly set or even if it can be adjusted, it is necessary to monitor the laser output power at all times during operation. In this connection, to always monitor the laser output power, part of a laser beam must be splitted or separated from the remaining major portion thereof by optical means such as a beam splitter, and this reduces the efficiency or the overall output power of the apparatus. In addition, special means such as a laser sensor or meter are required for sensing or measuring the laser output power. This results in a complicated construction of the apparatus and high costs for manufacture, and requires extra labor on the part of the operator.

SUMMARY OF THE INVENTION

Accordingly, the present invention is intended to solve the above-described various problems encountered with the conventional apparatuses.

It is an object of the present invention to provide a novel and improved discharge excitation type gas laser apparatus which is able to achieve uniform discharge in a space of a large cross sectional area while providing stable laser oscillations during a great number of repeated operations at a rate as high as tens to hundreds of shots per second.

Another object of the present invention is to provide a novel and improved discharge excitation type gas laser apparatus in which new and clear criteria for an optimal preionization timing can be used in place of the laser output power, whereby the preionization timing can be adjusted to an optimal point in time on the basis of the new criteria to provide a highly efficient laser oscillation.

In order to achieve the above objects, according to a first aspect of the invention, there is provided a discharge excitation laser apparatus comprising:

a pair of first and second primary electrodes disposed in a spaced opposed relation with respect to each other with a main discharge space defined therebetween;

excitation means connected to the first and second primary electrodes for causing main discharge therebetween to thereby generate laser oscillations of a laser gas in the main discharge space between the first and second primary electrodes; and preionization means disposed at a backside of the second primary electrode which is remote from the main discharge space for preionizing the laser gas therein prior to main discharging between the first and second primary electrodes, the preionization means comprising at least two different types of preionization systems.

According to this arrangement, the laser gas is preionized from the backside of the second primary electrode by means of the two different types of preionization systems, so that it generates a uniform and high density region of preionized electrons over a relatively large area without giving any substantial influences to the flow of circulating laser gas. As a result, even during repeated operations of the apparatus at a high rate of shots per second, very stable and highly efficient laser oscillations are obtained. In addition, due to the arrangement that the preionization means is disposed at the side of one of the primary electrodes alone, the overall construction of the primary electrodes is simple despite use of the plural types of preionization systems, enabling a sufficient reduction in the inductance of a main discharge loop or circuit, including the first and second primary electrodes, which is beneficial for highly efficient laser oscillations. This also makes it easy to assemble and maintain the electrodes and their associated parts.

Moreover, the preionization means can further comprise a preionization circuit having a switch for starting preionization connected to at least one of the preionization systems. The preionization circuit is independent of an excitation circuit which is connected to the excitation means for driving the latter, and the timing of operation of the excitation circuit and the timing of operation of the preionization circuit are respectively adjusted by an adjusting means to provide an optimal discharge timing and an optimal preionization timing, so that stable laser oscillations can be provided at all times.

According to a second aspect of the invention, there is provided a discharge excitation laser apparatus comprising:

a pair of first and second primary electrodes disposed in a spaced opposed relation with respect to each other with a main discharge space defined therebetween;

an excitation circuit connected to the first and second primary electrodes for causing main discharge therebetween to thereby generate laser oscillations of a laser gas in the main discharge space;

preionization means for preionizing a laser gas in the main discharge space prior to main discharge between the first and second primary electrodes; and preionization timing setting means for setting the timing of preionization in such a manner that an optimal preionization timing which gives a minimum of discharge starting voltage between the first and second primary electrodes is included in the duration of preionization.

The preionization timing setting means monitors a discharge starting voltage between the first and second primary electrodes at which main discharge therebetween begins to take place, and optimizes the preionization timing on the basis of the discharge starting voltage thus monitored.

According to a third aspect of the invention, there is provided a discharge excitation laser apparatus comprising:

a pair of first and second primary electrodes disposed in a spaced opposed relation with respect to each other with a main discharge space defined therebetween;

an excitation circuit connected to the first and second primary electrodes for causing main discharge therebetween to thereby generate laser oscillations of a laser gas in the main discharge space;

preionization means for preionizing a laser gas in the main discharge space prior to main discharge between the first and second primary electrodes; and preionization timing setting means for setting a timing of preionization in such a manner that an optimal preionization timing which gives a minimum of the time required from the time of applying a high voltage between the first and second primary electrodes until the time of start of main discharge is included in the duration of preionization.

The preionization timing setting means monitors the length of time from the time of applying a high voltage between the first and second primary electrodes until the time of start of main discharge therebetween, and optimizes the preionization timing on the basis of the length of time thus monitored.

According to the above arrangements in respect of the second and third aspects, the preionization timing can be set to an optimal timing for highly efficient laser oscillations in a very easy manner without measuring the laser output power.

In addition, since the operation of the excitation circuit is determined by a circuit constant thereof, the time required from the time of applying a high voltage to the first and second primary electrodes until the time of start of main discharge therebetween decreases as the absolute value of the discharge starting voltage between the first and second primary electrodes decreases. Accordingly, a preionization timing that provides the shortest time from the time of application of a high voltage between the first and second primary electrodes until the time of start of main discharge therebetween is equal to a preionization timing that provides a minimum absolute value of discharge starting voltage. Thus, the same results will be attained if an optimal preionization timing that provides the shortest time from the time of voltage application until the time of start of main discharge is set such that it is included in the duration of preionization.

The above and other objects, features and advantages of the present invention will more readily become apparent from the ensuing detailed description of several preferred embodiments of the invention taken in conjunction with the accompanying drawings.

DESCRIPTION OF THE PREFERRED EMBODIMENTS

Preferred embodiments of the present invention will now be described in detail while referring to the accompanying drawings.

Figure 1:
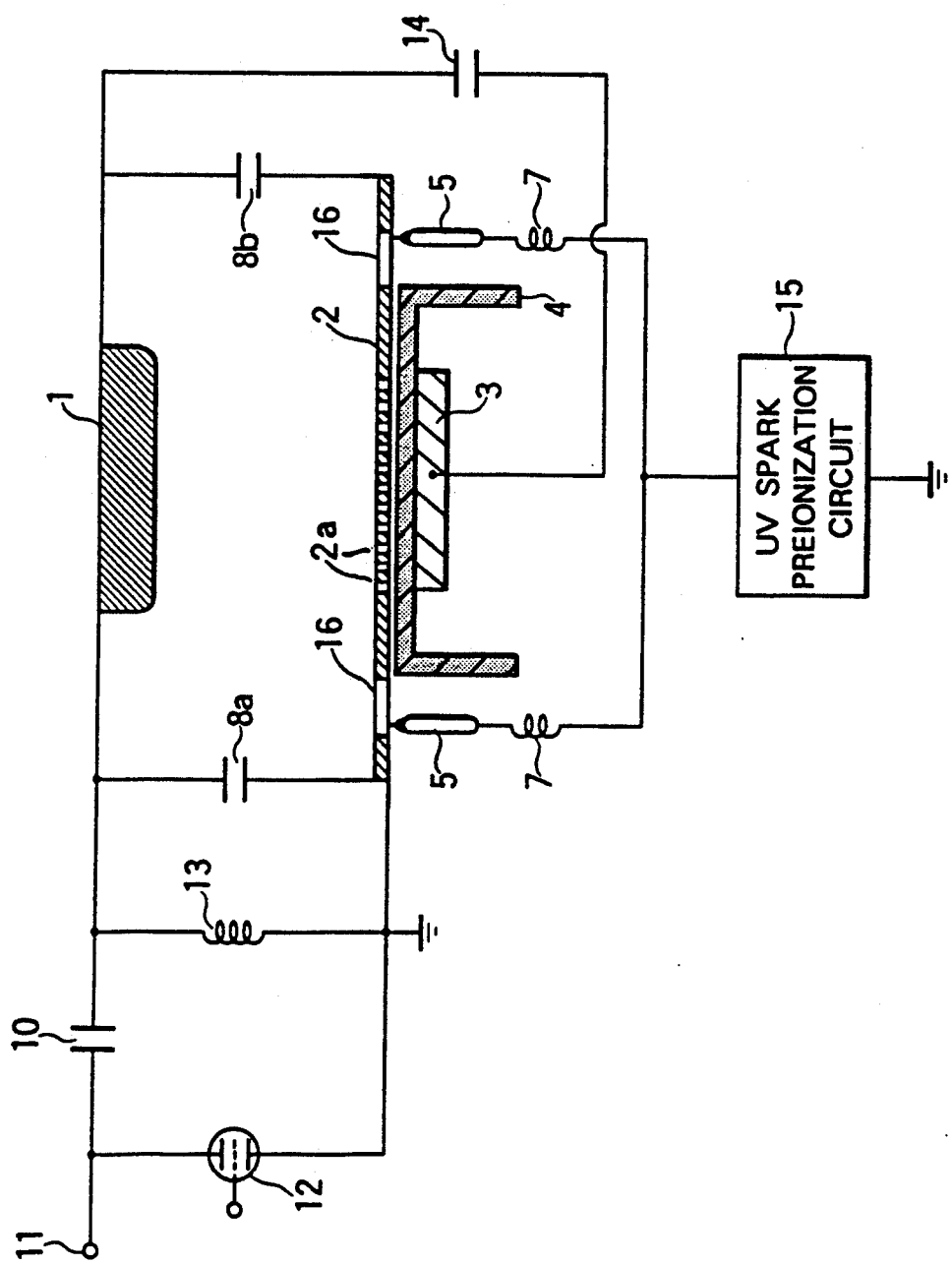
FIG. 1 is a circuit diagram of a discharge excitation gas laser apparatus in accordance with a first embodiment of the invention.

FIG. 1 illustrates the construction of a discharge excitation gas laser apparatus constructed in accordance with a first embodiment of the invention. In this figure, the apparatus illustrated includes a first primary electrode 1 formed of a metal board having an elongated or rectangular configuration, and a second primary electrode 2 formed of a flat metal plate or board of an elongated or rectangular configuration, in plan view. The second primary electrode 2 has a plurality of through-holes 2a formed therein, the second primary electrode 2 being disposed in a spaced parallel relation with respect to the first primary electrode 1. A secondary or auxiliary electrode 3 is disposed at the backside of the second primary electrode 2 (i.e., that side of the electrode 2 which is remote from the first primary electrode 1) with a dielectric member 4 interposed therebetween. The auxiliary electrode 3 is formed of a metal board having a substantially elongated or rectangular shape with its longitudinal and transverse dimensions being less than those of the second primary electrode 2. Preferably, the planar size of the auxiliary electrode 3 is substantially equal to or slightly greater than a partial area of the second primary electrode 2 in which the throughholes 2a are formed. A plurality of first pin electrodes 5 are disposed near and along the opposite sides of the second primary electrode 2 at the backside thereof at intervals and extend longitudinally along the second primary electrode 2. The second primary electrode 2 is connected at opposite sides thereof via a pair of first and second peaking capacitors 8a, 8b to the opposite sides of the first primary electrode 1. A storage capacitor 10 has one end thereof connected to a junction between the first peaking capacitor 8a and the first primary electrode 1, and the other end thereof connected to a supply terminal 11 through which the storage capacitor 10 is charged with a high voltage. A switch 12 such as a thyratron has a first end thereof connected to a junction between the charging capacitor 10 and the supply terminal 11 and a second end thereof connected to a junction between the first peaking capacitor 8a and the second primary electrode 2. The switch 12 switches on and off an excitation circuit comprising the elements 1, 2, 8a, 8b, 10 and 13. A charging coil 13 has one end thereof connected to a junction between the charging capacitor 10 and the first peaking capacitor 8a, and the other end thereof connected to a junction between the switch 12 and the first peaking capacitor 8a in parallel with the first and second peaking capacitors 8a for preventing these capacitors 8 from being charged during the charging of the storage capacitor 10. To this end, the inductance of the charging coil 13 is set to be sufficiently greater than the total inductance of a closed loop comprising the switch 12, the storage capacitor 10 and the peaking capacitors 8a, 8b. A dividing capacitor 14 has one end thereof connected to a junction between the first primary electrode 1 and the second peaking capacitor 8b, and the other end thereof connected to the secondary or auxiliary electrode 3 for regulating a voltage applied to the auxiliary electrode 3. A UV spark preionization circuit 15 is connected to the first pin electrodes 5 via shunt coils 7 for applying a high voltage to the pin electrodes 5. The second primary electrode 2 has light-transmission apertures 16 perforated therethrough at locations facing the tip ends of the pin electrodes 5 for allowing ultra violet rays, which are generated by arc discharges occurring between the pin electrodes 5 and the second primary electrode 2, to pass therethrough and reach a major discharge area or space defined between the opposed first and second primary electrodes 1, 2.

The operation of this embodiment will now be described in detail below. A high voltage is applied from the supply terminal 11 to the storage capacitor 10 via the charging coil 13. In this state, when the switch 12 is turned on, charged electrons stored in the storage capacitor 10 flow into the peaking capacitors 8a, 8b to rapidly raise voltages across them. The voltage across each of the peaking capacitors 8a, 8b is equal to a voltage between the first and second primary electrodes 1, 2. Also, applied to the secondary or auxiliary electrode 3 is a voltage which is equal to the voltage between the first and second primary electrodes 1, 2 divided by a ratio of the electrostatic capacity of the dividing capacitor 14 to the capacity of a preionization capacitor which comprises the second primary electrode 2, the auxiliary electrode 3 and the dielectric member 4. When the voltage applied to the auxiliary electrode 3 increases to a predetermined high level, a strong electric field develops in each throughhole 2a in the second primary electrode 2 to thereby start a corona discharge therein. Thus, ultra violet rays are generated by the corona discharges to preionize the laser gas in the space between the first and second primary electrodes 1, 2. Simultaneous with this, the UV spark preionization circuit 15 is energized to apply a high voltage to the pin electrodes 5, thus causing arc discharges between the pin electrodes 5 and the second primary electrode 2. Upon arc discharging, there develop ultra violet rays which pass through the light transmission apertures 16 in the second primary electrode 2 into the major discharge space between the first and second primary electrodes 1, 2 to preionize the laser gas therein. When the voltage applied to the peaking capacitors 8a, 8b increases to a level at which dielectric break-down takes place between the first and second primary electrodes 1, 2, a main or major discharge begins to develop, thus exciting the laser gas.

In this regard, as referred to before, the width or transverse length of the primary or major discharge can be sufficiently increased by preionizing the laser gas through ultra violet rays generated by corona discharges from the backside of the second primary electrode 2. In addition, by the provision of the preionization means of the UV spark preionization type disposed on the opposite sides of the preionization means of the corona discharge type, an extremely high density of preionized electrons can be obtained which could not otherwise be attained with the separate or single use of the corona type preionization means alone. As a result, it is possible to achieve a large area, spatially uniform discharge. Further, in this embodiment, since the pin electrodes 5 acting as the preionization means are disposed behind the second primary electrode 2, the laser gas can be circulated without being disturbed by the preionization means. Added to this is that impurities and the like produced upon arc discharges do not contaminate the major discharge space at all. Under the combined effects of these factors, stable ad uniform major discharge can be achieved even during repeated operations at a rate of major discharges even as high as hundreds of shots per second.

According to the electrode construction of this embodiment, two different types of preionization means are disposed at the backside of the second primary electrode 2, which also acts as second pin electrodes cooperating with the first pin electrodes 5, thereby simplifying the overall structure of the apparatus. Accordingly, the inductance of the major discharge loop or circuit can be minimized to a satisfactory extent. This is very advantageous in performing highly efficient excitation and contributes to easy maintenance of electrical parts of the apparatus.

Figure 2:
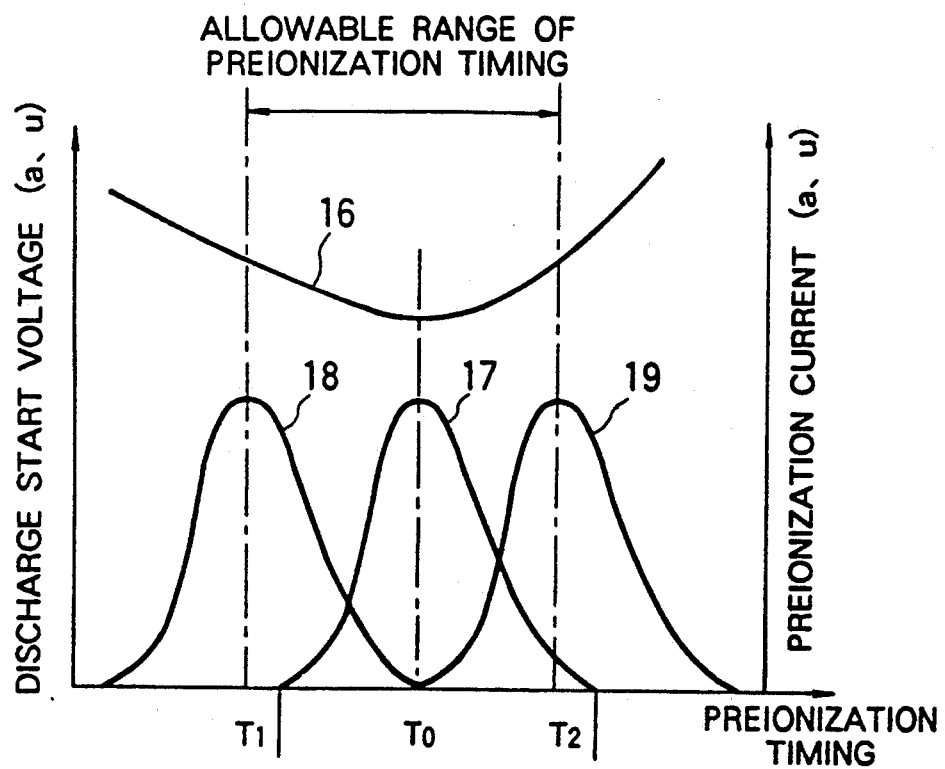
FIG. 2 is a diagrammatic view showing a relation between the discharge starting voltage, the preionization timing and the preionization current in the present invention.

According to another aspect of the invention, the preionization timing can be controlled or determined in relation to a discharge starting voltage at which major discharge between the first and second primary electrodes 1, 2 begins to take place. In one form of the invention, the preionization timing is controlled to minimize the absolute value of a discharge starting voltage at which a major discharge starts. In this connection, FIG. 2 exemplarily illustrates a relation between a range of preionization timing and the discharge starting voltage according to the invention. In this figure, the abscissa represents the preionization timing which is defined as a time elapsed from the time when a voltage is imposed between the first and second primary electrodes 1, 2 until the time when a pulse current flowing through the preionization means reaches a peak value, and the ordinate represents the discharge starting voltage. In this example, the preionization timing is set in a range from $T_1$ to $T_2$. In FIG. 2, curve 16 designates the preionization timing dependency of the discharge starting voltage; curve 17 designates the waveform of a pulse current flowing through the preionization means at a preionization timing T0 which minimizes the discharge starting voltage between the first and second primary electrodes 1, 2; curve 18 designates the waveform of a pulse current flowing through the preionization means at a preionization timing $T_1$; and curve 19 designates the waveform of a pulse current flowing through the preionization means at a preionization timing $T_2$. It is considered that during the time in which current is flowing through the preionization means, preionization is taking place. In the figure, a pulse width designated at $\tau$ represents a length of time in which the preionization continues; $T_1$ is a preionization timing with a pulse current terminating at time $T_0$; and $T_2$ is a preionization timing with a pulse current starting at time $T_0$. If the range for preionization timing is set from $T_1$ to $T_2$ as shown in FIG. 2, it includes the preionization timing $T_0$ which achieves a minimum discharge starting voltage between the first and second primary electrodes.

Figure 3:
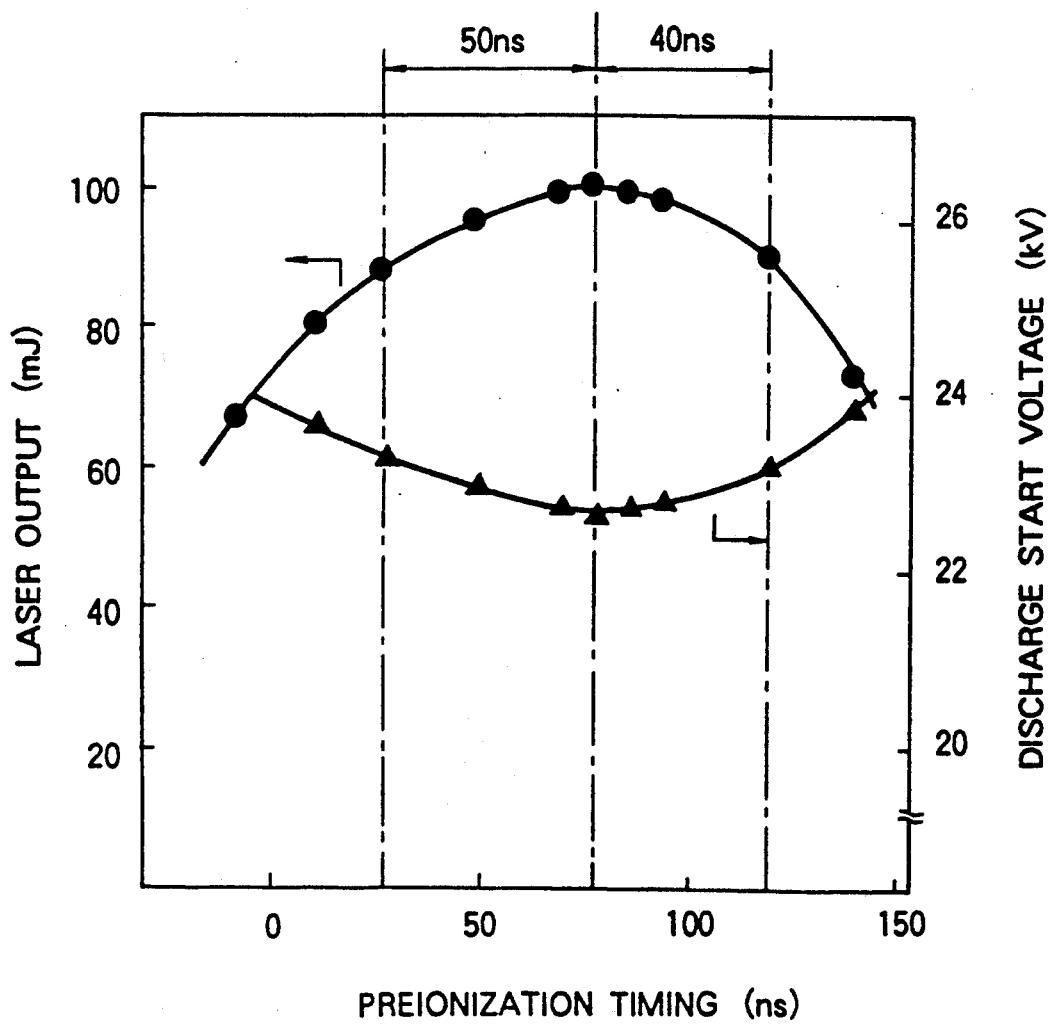
FIG. 3 is a diagrammatic view showing a relation between the laser output, the preionization timing and the discharge starting voltage in the present invention.

FIG. 3 shows a relationship between the laser output power, the discharge starting voltage between the first and second primary electrodes, and the preionization timing as actually measured. In this figure, the abscissa represents the preionization timing, and the ordinate represents the laser output power at the left side and the discharge starting voltage at the right side. The upper curve designates the laser output power, and the lower curve designates the discharge staring voltage. From this figure, it can be seen that a preionization timing which gives a maximum laser output power substantially coincides with a preionization timing which gives a minimum discharge starting voltage.

Figure 4:
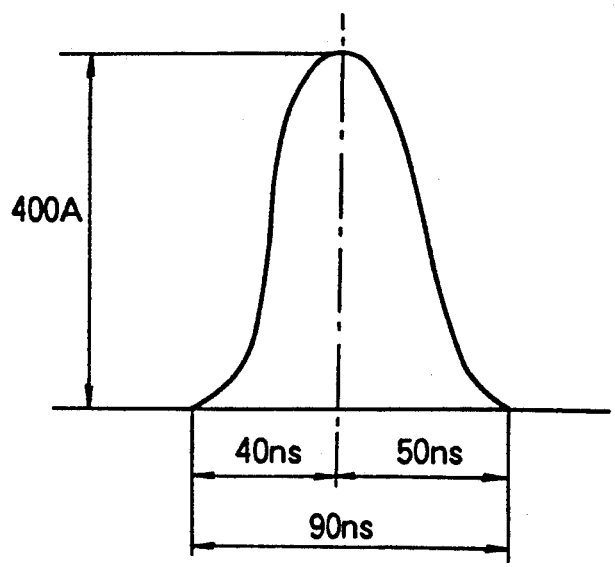
FIG. 4 is a diagram showing, on an enlarged scale, the waveform of a preionization pulse in FIG. 2.

FIG. 4 illustrates the waveform of a pulse current flowing through the preionization means at the time of measurement of the above relationship of FIG. 3. In this figure, a peak value for the pulse current is about 400 Amperes; a length of time from the start of rising to the peak of the current is about 40 ns,; a length of time from the peak of the current to the termination of the current is 50 ns; and a pulse width of the current (i.e., duration of preionization) is about 90 ns. According to the chart of FIG. 2, an optimal preionization timing can be set at a point in time from a time 50 ns before the preionization timing that gives a minimum discharge starting voltage between the first and second primary electrodes to a time 40 ns thereafter. Also, from the chart of FIG. 3, it is evident that in the preionization range thus set, laser output power of more than 80% of its maximum can be obtained. Thus, laser oscillation can be performed with high efficiency.

Figure 5:
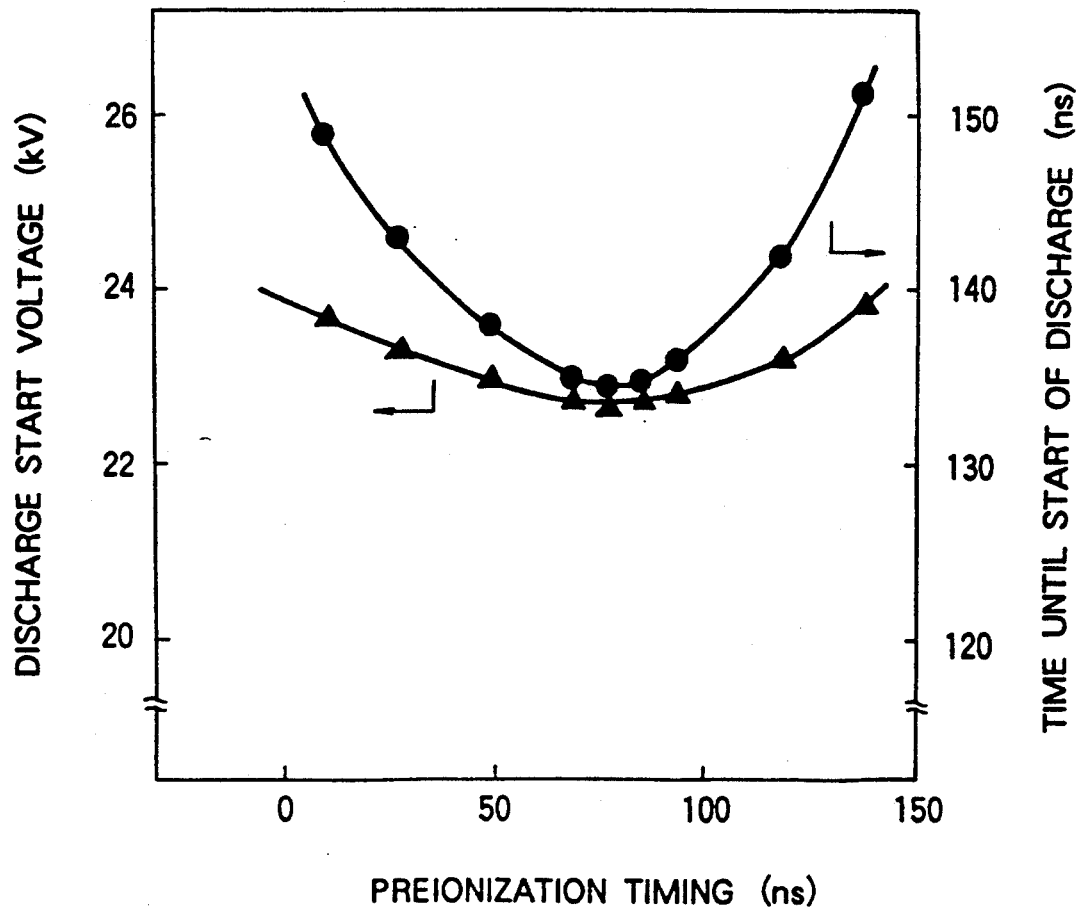
FIG. 5 is a diagrammatic view showing a relation between the discharge starting voltage, the preionization timing and the time required from the start of preionization until the start of major discharge in the present invention.

FIG. 5 illustrates another example of a relationship between the discharge starting voltage between the first and second primary electrodes, a length of time from the start of applying a voltage between the first and second primary electrodes until the start of discharging between the first and second primary electrodes, and the preionization timing as actually measured. In this example, the preionization timing is defined in the same manner as in the example of FIG. 2. The operation of the excitation circuit is determined by a circuit constant thereof, so a length of time required from the imposition of a voltage between the first and second primary electrodes to the start of major discharge decreases in accordance with the decreasing absolute value of the discharge starting voltage. In FIG. 4, a length of time required from a reference time at which a voltage begins to be applied between the first and second primary electrodes until the time at which a discharge starts therebetween is plotted against the preionization timing. It is clear that a preionization timing that gives a minimum of discharge starting voltage is in coincidence with a preionization timing that gives the shortest time required to start discharge. In this regard, in place of the discharge starting voltage, a length of time required until the start of discharging between the first and second primary electrodes can be used as a reference for an optimal preionization timing with substantially the same results.

Although in the above description, the length of time required for starting a major discharge is measured from the time of imposition of a voltage between the first and second primary electrodes, it can be measured from another reference time in relation to the operation of the excitation circuit such as a point in time at which a voltage imposed between the first and second primary electrodes reaches a predetermined value.

If the preionization timing is set as close as a preionization timing that gives a minimum absolute value of discharge starting voltage, more efficient laser oscillation can be obtained.

Figure 6:
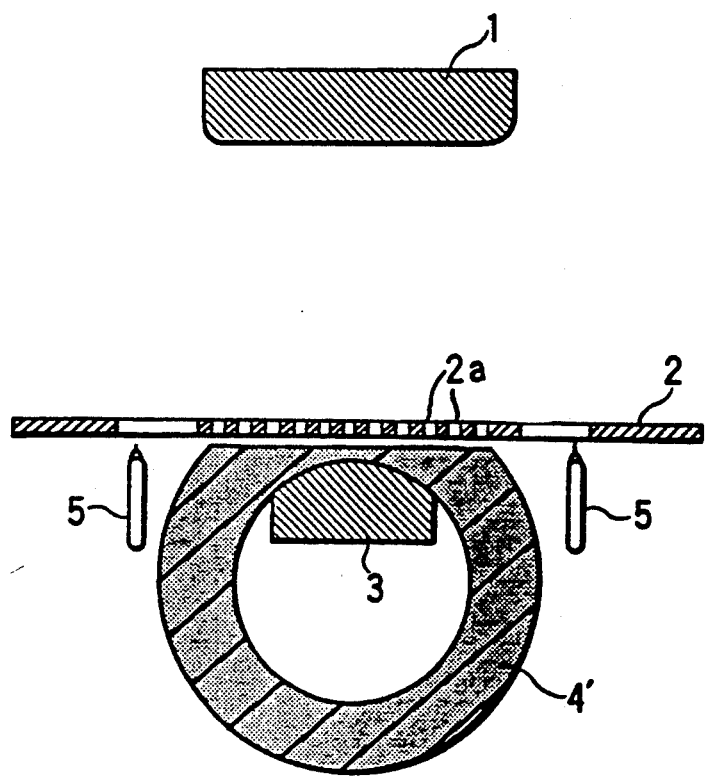
FIG. 6 depicts a modified form of electrodes construction in accordance with the invention.

FIG. 6 shows a modified form of electrode construction. In this modification, a dielectric member 4', which corresponds to the rectangular dielectric member 4 of the channel-like cross section in the previous embodiment, is of a substantially cylindrical configuration. A portion of the cylindrical dielectric member 4' is cut to provide a longitudinally extending flat surface facing that area of the second primary electrode 2 in which a plurality of throughholes 2a are formed. A longitudinally extending auxiliary electrode 3 is disposed in and surrounded by the cylindrical dielectric member 4' and has an arcuate surface which is configured to conform an inner surface of the dielectric member 4' so as to make intimate contact therewith. In case of using the dielectric member 4 in the form of the planar or channel-like configuration in the corona type preionization, the rectangular-shaped dielectric member 4 must have considerably large dimensions both in the longitudinal and widthwise (i.e., transverse) directions in comparison with the auxiliary electrode 3 in order to prevent short-circuiting between the second primary electrode 2 and the auxiliary electrode 3 through surface discharge therealong. In this modification, however, the cylindrical-shaped dielectric member 4' serves to prevent surface discharge from coming from the auxiliary electrode 3 to the second primary electrode 2 in the widthwise or transverse directions of the dielectric member 4'. As a result, the pin electrodes 5 can be disposed at locations much closer to the center of the major discharge space defined between the first and second primary electrodes 1, 2 than with the flat or channel-shaped dielectric member 4 of FIG. 1. This not only provides a higher preionized electron density in the major discharge space but also makes the electrode structure more compact and minimized, thereby enabling a substantial reduction in the inductance of the main discharge loop or circuit.

Figure 7:
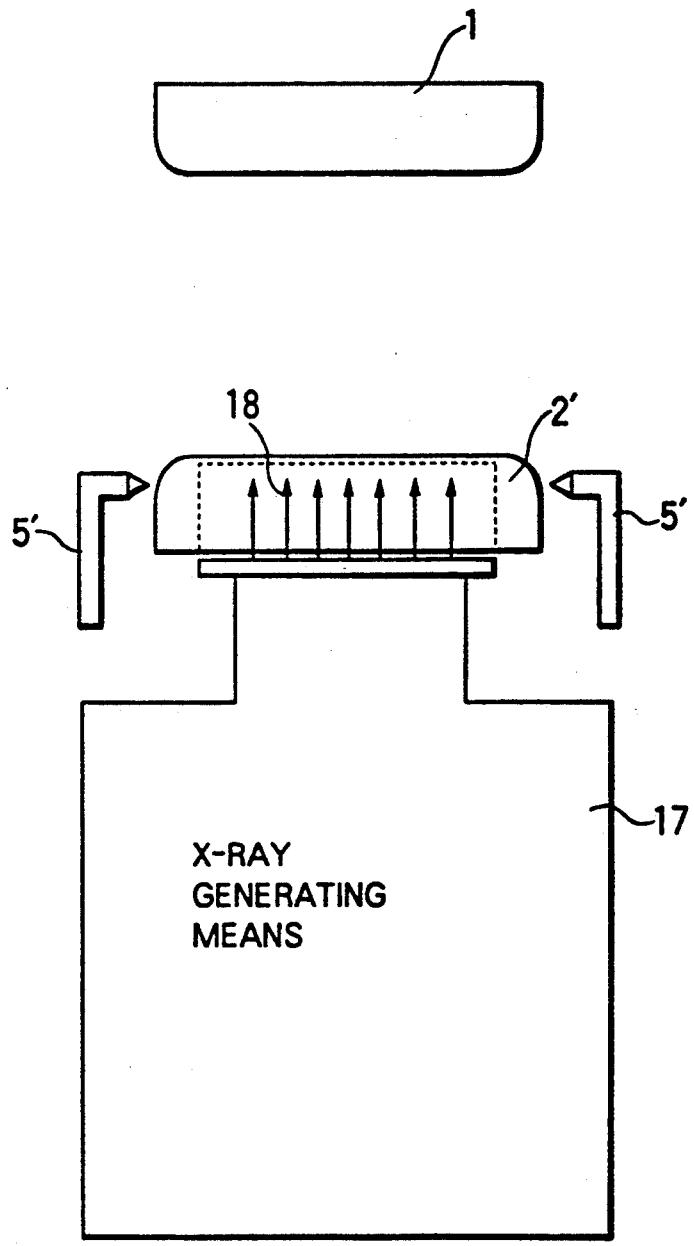
FIG. 7 depicts major portions of a discharge excitation gas laser apparatus in accordance with another embodiment of the invention.

Although the above embodiments employ the preionization means formed of a combination of the UV spark preionization system with the corona preionization system, FIG. 7 shows a further embodiment of the invention in which the preionization means are formed of a combination of an X-ray preionization system and a UV spark preionization system. Specifically, in this embodiment, a pair of first and second primary electrodes 1, 2' are disposed in a spaced parallel relation with respect to each other, and connected to an illustrated excitation circuit, as in the embodiment of FIG. 1. An X-ray generating means 17 is disposed at the backside of the second primary electrode 2' for generating X rays 18 toward a space defined between the opposed first and second primary electrodes 1, 2' through the second primary electrode 2'. In this embodiment, the second primary electrode 2' has a cross-sectional thickness that is recessed to form a thin wall, as designated by the broken line in FIG. 7, so as to permit the passage therethrough of the X rays 18 from the X-ray generating means 17, to thereby preionize a laser gas in a space between the first and second electrodes 1, 2'. In addition to the X-ray generating means 17, a multitude of pin electrodes 5' each in the shape of an inverted L-shaped configuration are disposed at opposite sides of the second primary electrode 2'. Their tapered tip ends are directed toward the adjacent side surfaces of the second primary electrode 2', so that arc discharges are generated between the pin electrodes 5' and the second primary electrode 2', to produce ultra violet rays, thus further preionizing the laser gas.

Here, it is to be noted that X rays have a high transmissivity with respect to a laser gas, so preionization by means of X rays can provide a very uniform distribution of preionized electron density. In order to obtain a high preionized electron density, however, it is necessary to increase the quantity of X rays irradiated on the laser gas. Increasing the quantity of X rays by use of a single X-ray generator requires improving or modifying the performance and/or arrangement of the X-ray generator, which is very difficult and expensive. In contrast, according to this embodiment, it is possible to obtain a high and spatially uniform preionized electron density in a relatively easy and inexpensive manner to thereby achieve a large area, uniform discharge. Thus, it follows that laser oscillations can be achieved with a high degree of efficiency.

Moreover, it should be noted that preionization timing with respect to the major discharges has a great influence on the efficiency and stability of laser oscillations. To obtain laser oscillations in an efficient and stable manner, preionization of the laser gas has to be effected at an appropriate timing with respect to the major discharge. In the circuit arrangement of the first mentioned embodiment as illustrated in FIG. 1, the preionization circuit for preionization and the excitation circuit for the major discharge are not separated or independent of each other in terms of the corona preionization system. Thus, the timing of corona discharge is determined by a first type of circuit constant (which is in turn determined by the capacity of each capacitor used, the capacity being set according to circuit specifications) as well as by a second type of circuit constant such as a circuit inductance which is determined by the arrangement, dimensions and the like of the entire circuit. On other hand, in terms of the spark preionization system, the a preionization circuit is being employed which is independent of the excitation circuit, so it is necessary to provide a means for controlling the operational timing between the preionization circuit and the excitation circuit.

Figure 8:
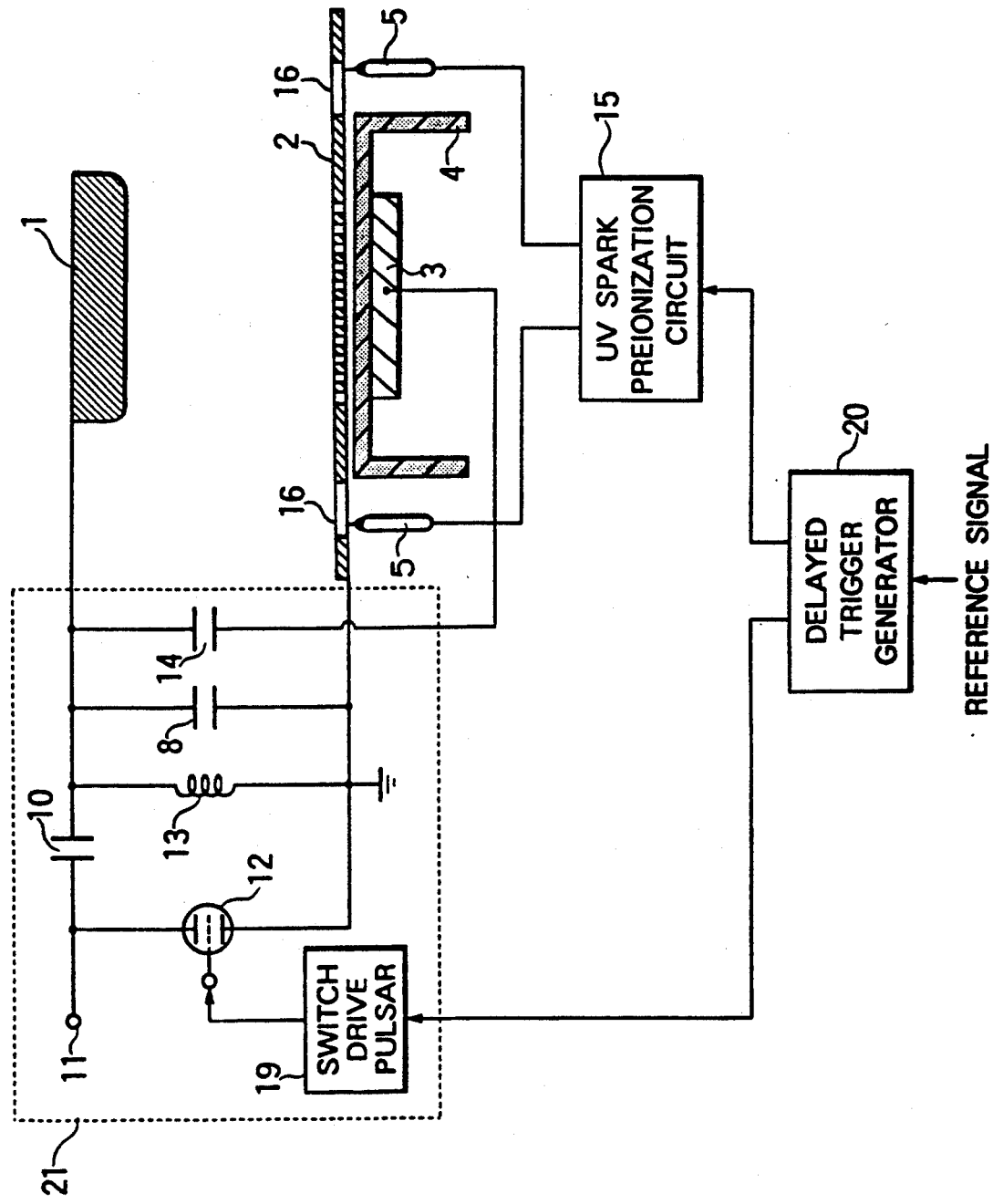
FIG. 8 is a block diagram of a discharge excitation gas laser apparatus in accordance with a further embodiment of the invention.

FIG. 8 illustrates a further embodiment of the invention in which such a timing control means for controlling timing between major discharge and preionization is provided. Specifically, this embodiment is substantially similar in construction and operation to the first-mentioned embodiment of FIG. 1 except for the provision of the timing control means. The timing control means includes a switch drive pulsar 19 for driving the switch 12, and a delayed trigger generator 20 for generating a delayed signal with a desired time delay with respect to a reference signal input thereto. In FIG. 8, the components enclosed by broken line 21 together constitute an excitation circuit for generating major discharges.

The operation of the FIG. 8 embodiment will be described in detail below. First, in this embodiment, a preionization means is formed of a combination of a UV spark preionization system and a corona preionization system. The corona preionization circuit is included by the excitation circuit 21, so the timing of corona discharges in relation to the timing of major discharges is determined by a circuit constant of the excitation circuit 21. Thus, when the switch 12 is turned on, corona discharge is automatically initiated at a predetermined timing. In contrast to this, the UV spark preionization circuit 15 is independent of the excitation circuit 21. When a reference signal is input to the delayed trigger generator 20 from an external or internal signal generating means (not shown), the delayed trigger generator 20 generates an excitation circuit drive signal and a UV spark preionization circuit drive signal at respective desired timings delayed with respect to the reference signal. The excitation circuit drive signal thus generated is input to the switch drive pulsar 19 which is thereby triggered to immediately start its switching operation. On the other hand, when the preionization circuit drive signal is input to the UV spark preionization circuit 15, the latter is turned on to start its operation. The delayed trigger generator 20 is able to cause arc discharging between the pin electrodes 5 and the second primary electrode 2 to occur at an appropriate timing with respect to a major discharge.

In this connection, even with the switch drive pulsar 19 such as a thyratron drive pulsar for driving the switch 12 in the form of a thyratron, it is impossible to completely suppress jitters of the switch 12 or the excitation circuit 21. The embodiment of FIG. 8 is a timing control system in which the excitation circuit 21 and the preionization circuit 15 are operated on the basis of one and the same reference signal input to the delayed trigger generator 20. With this timing control system, if there are great jitters in the excitation circuit 21, the timings for corona preionizations may possibly deviate from the optimal timing.

Figure 9:
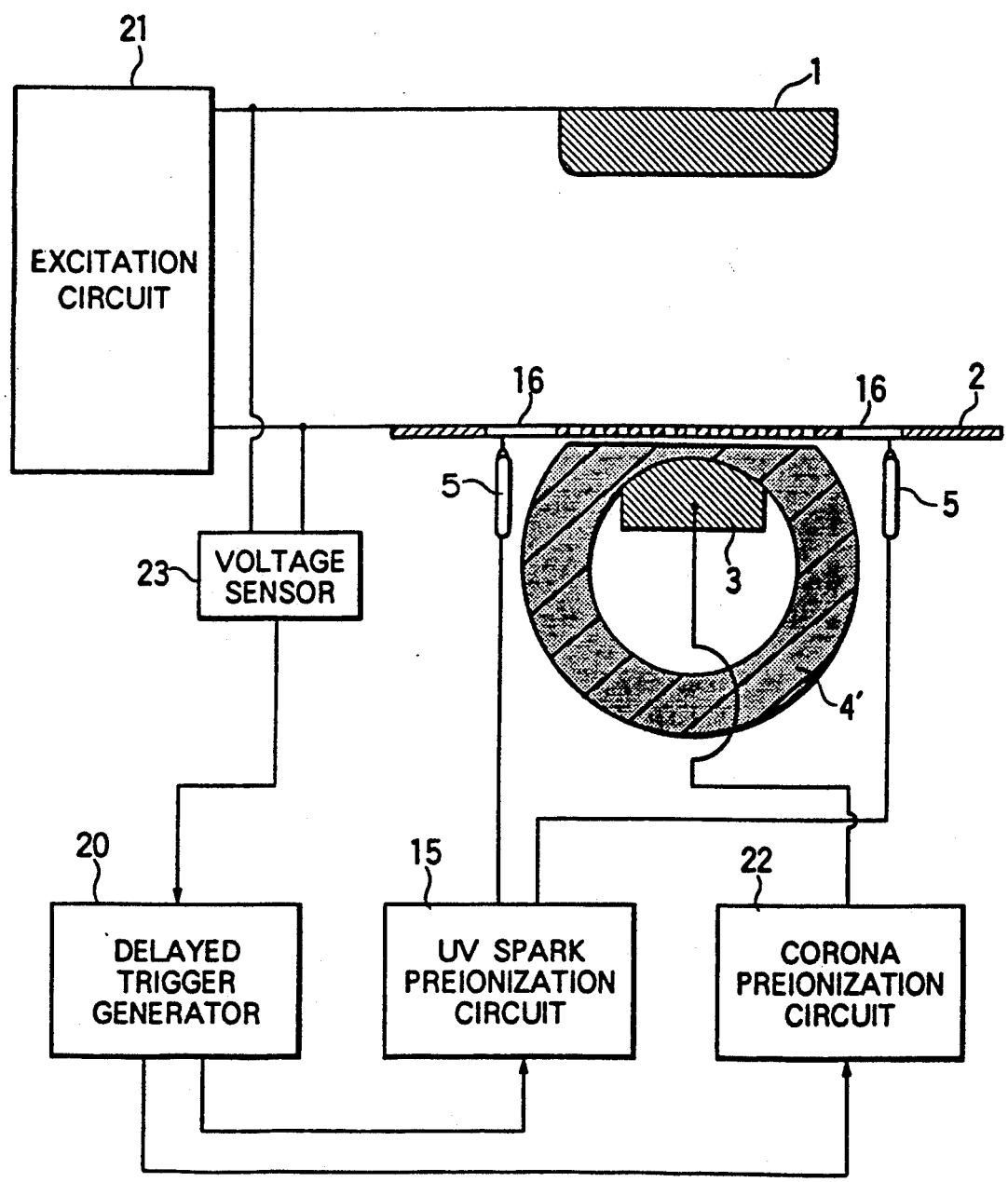
FIG. 9 is a block diagram of a discharge excitation gas laser apparatus in accordance with a yet further embodiment of the invention.

FIG. 9 illustrates a further embodiment of the invention which is able to control such deviations in the control timings between a major discharge and preionizations. In this embodiment, the preionization means is a combination of a corona preionization system and a UV spark preionization system in which an excitation circuit and two preionization circuits are formed independent of each other. This embodiment is substantially similar in construction and operation to the FIG. 8 embodiment except for the following. Namely, a corona preionization circuit 22, which is connected to an auxiliary electrode 3 for applying a high voltage thereto, is connected to a delayed trigger generator 20. A UV spark preionization circuit 15 for applying a high voltage to a plurality of pin electrodes 5 is also connected to the delayed trigger generator 20. A voltage sensor 23 is connected between a first and a second primary electrode 1, 2 for sensing a voltage therebetween and generating an output signal to the delayed trigger generator 20. A dielectric member 4' of a cylindrical configuration is interposed between the second primary electrode 2 and the secondary or auxiliary electrode 3, as in the embodiment of FIG. 6. When the excitation circuit 21 is energized or powered on, there is a sharp change in the voltage between the first and second primary electrodes 1, 2, which is sensed by the voltage sensor 23. When sensing such a sharp voltage change, the voltage sensor 23 generates a signal to the delayed trigger generator 20. Based on the signal input from the voltage sensor 23, the delayed trigger generator 20 energizes or turns on the UV spark preionization circuit 15 and the corona preionization circuit 22 with a predetermined time delay. Accordingly, the start timing of the preionization circuits 15, 22 is precisely controlled in accordance with energization of the excitation circuit 21 irrespective of erjitters in the excitation circuit 21 during its operation. That is, deviations in timing between major discharges and preionizations can be suppressed below or within an amount caused by the jitters.

Although the above embodiment of FIG. 9 employs a combination of the corona preionization system and the UV spark preionization system, combinations of other types of preionization systems such as a combination of an X-ray preionization system and a UV spark preionization system, a combination of an X-ray preionization system and a corona preionization system and the like can be used while providing substantially the same results.

In the above embodiments as described, according to another aspect of the invention, a range for preionization timing can be determined in relation to a discharge-starting voltage at which a major discharge begins between the first and second primary electrodes 1, 2.

Figure 10:
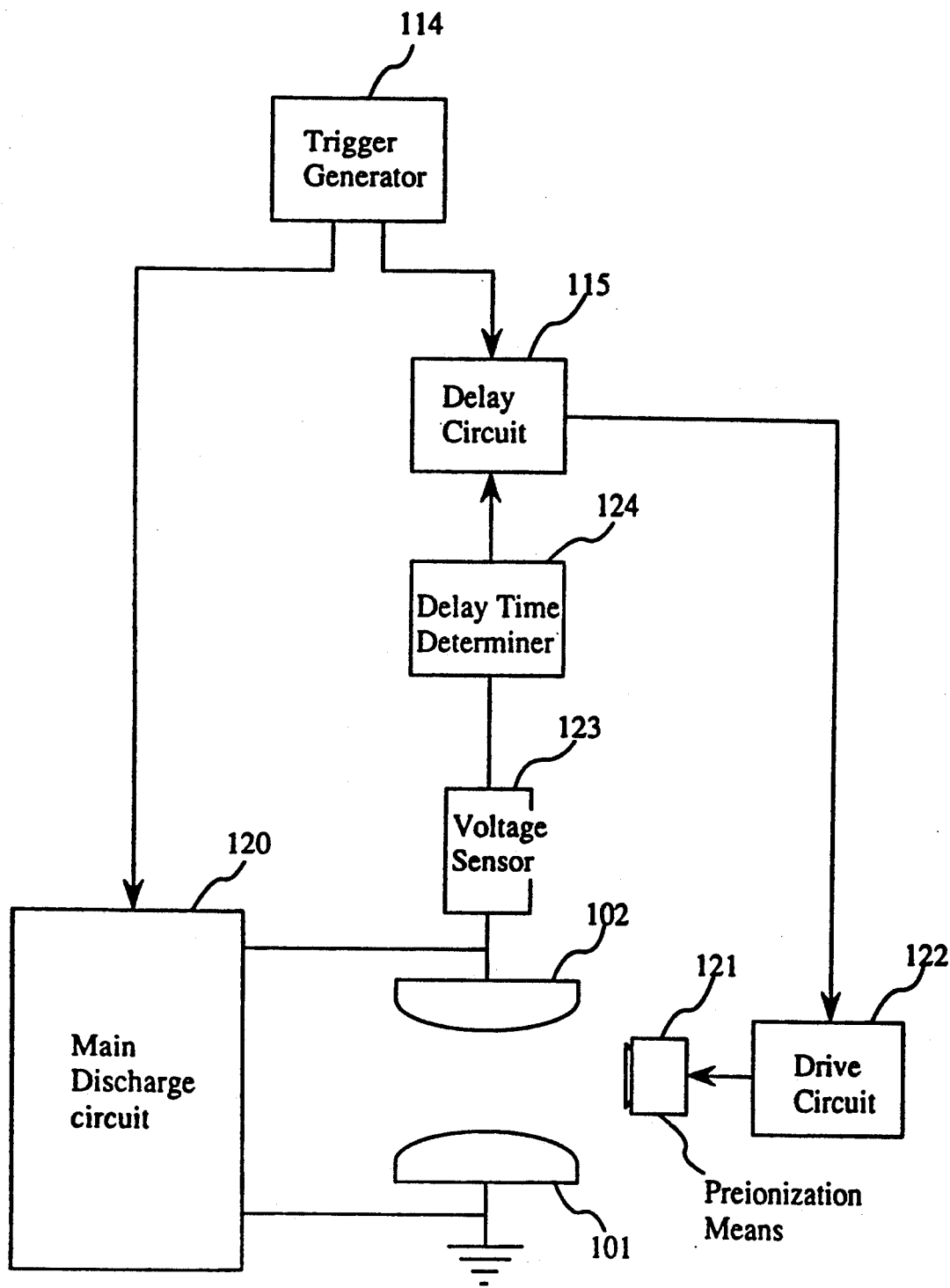
FIG. 10 is a block diagram of a discharge excitation gas laser apparatus in accordance with yet another embodiment of the invention.

FIG. 10 illustrates in block form the arrangement of a further embodiment of the invention. In this embodiment, a pair of first and second primary electrodes 101, 102, which may be the same as the elements 1, 2 of FIG. 1, are disposed in a spaced parallel relation with respect to each other with a main discharge space defined therebetween, as in the embodiment of FIG. 1. A main ionization circuit 120, which may be the same as the element 21 of FIG. 8, is connected to the first and second primary electrodes 101, 102 for applying a high voltage between the first and second primary electrodes 101, 102 to cause a major discharge therebetween. A preionization means 121, which may comprise the elements 3–5, 7 and 16 of FIG. 1, is disposed beside the main discharged space between the first and the second primary electrodes 101, 102 for performing preionizations. A preionization means drive circuit 122 is connected to the preionization means 121 for driving the same. A trigger generator 114 is connected to the main ionization circuit 120 for supplying thereto a trigger signal it is also connected via a delay circuit 115 to the preionization means drive circuit 122 for supplying thereto another trigger signal at a prescribed time delay which is determined by the delay circuit 115. A voltage sensor 123 senses and monitors a voltage between the first and second primary electrodes 101, 102 generates a corresponding signal to a delay time determiner 124. Based on the output signal from the voltage sensor 123, the delay time determiner 124 successively senses a discharge starting voltage between the first and second primary electrodes 101, 102 at which a primary or major discharge between the electrodes 101, 102 begins to develop. It then determines an appropriate preionization timing for next or coming preionization and sends a corresponding signal to the preionization means drive circuit 122, which can properly change the prescribed delay time set by the delay circuit 115 on the basis of the output signal from the delay time determiner 124.

The operation of the above embodiment will be described below. First, the trigger generator 114 concurrently generates two trigger signals, one of which is directly fed to the main ionization circuit 120, which is thereby energized to apply a high voltage between the first and second primary electrodes 101, 102. The other trigger signal is fed through the delay circuit 115 to the preionization means drive circuit 122 with a prescribed time delay set by the delay circuit 115. Thereby, the preionization means drive circuit 122 is energized to drive the preionization means 121 for preionizing the laser gas between the first and second primary electrodes 101, 102. When the voltage applied between the first and second primary electrodes 101, 102 by the main ionization circuit 120 exceeds a dielectric break-down voltage between the primary electrodes 101, 102, a major discharge therebetween begins to take place. A discharge starting voltage at which the major discharge begins is always monitored by the voltage sensor 123. By making a comparison between two preceding discharge starting voltages sensed by the voltage sensor 123, the delay time determiner 124 determines an appropriate delay time for the coming preionization timing of the preionization means 121, and generates a corresponding signal to the preionization means drive circuit 122 to properly change the prescribed delay time set by the delay circuit 115.

Figure 11:
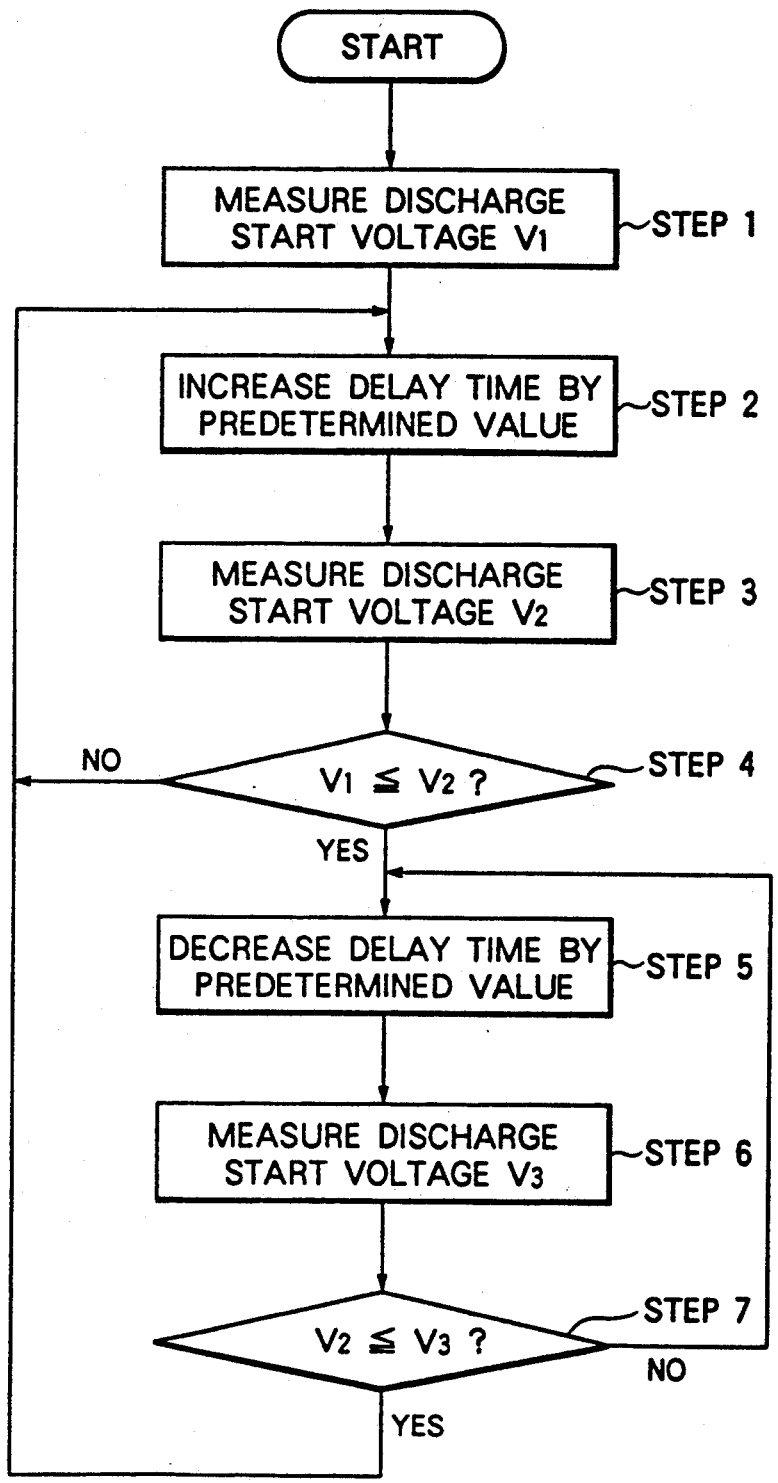
FIG. 11 shows an example of a delay time determining process performed in accordance with one aspect of the invention.

FIG. 11 shows an example of a delay time determining process performed by the delay time determiner 124. The delay time determiner 124 has a default value for a first preionization timing. As illustrated in FIG. 11, an appropriate delay time for a next or coming preionization is determined as follows. First in Step 1, the delay time determiner 124 senses a first discharge starting voltage between the first and second primary electrodes 101, 102. Then, in Step 2, it determines a first delay time, which is a sum of the default value and a predetermined value. In Step 3, a next or second discharge starting voltage is sensed. In Step 4, it is determined whether the first discharge starting voltage is equal to or less than the second discharge starting voltage. If the answer to this question is "NO", then the process returns to Step 2 where a second delay time is determined by adding the predetermined value to the first delay time. If, however, the answer is "YES", then in Step 5, a new or second delay time is determined by subtracting the predetermined value from the first delay time. Thereafter, in Step 6, a third discharge starting voltage is sensed, and then in Step 7, it is determined whether the third discharge starting voltage is equal to or less than the previous second discharge starting voltage. If the answer to this question is "NO", the process returns to Step 5 where a new or third delay time is determined by subtracting the predetermined value from the previous or second delay time. If, however, the answer in Step 7 is "YES", the process returns to Step 2 where a new or third delay time is determined by adding the predetermined value to the second delay time. Thereafter, Steps 2 through 7 are repeated as necessary. In this manner, a preionization timing can be maintained within a range around a preionization timing which gives a minimum discharge starting voltage between the first and second primary electrodes, added thereto or subtracted therefrom the predetermined delay time set by the delay time determiner 124. In addition, according to this embodiment, there is no need to extract part of the laser output power for continuous monitoring, so any substantial reduction in laser output power or efficiency can be avoided while maintaining the preionization timing at an optimal value. To this end, since it is only necessary to measure the voltage between the first and second primary electrodes, this embodiment is simple and hence can be readily reduced into practice at low costs.

Figure 12:
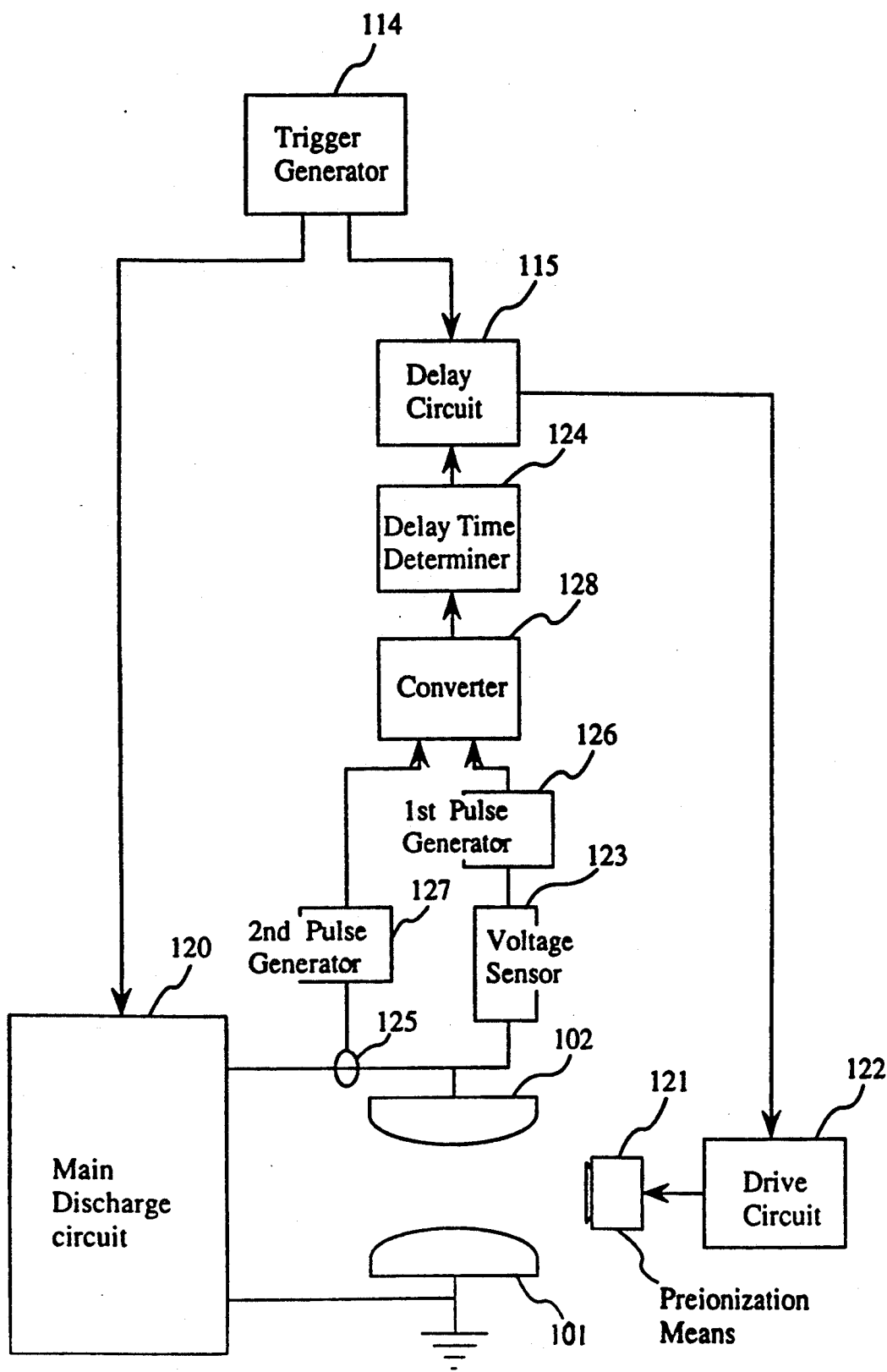
FIG. 12 is a block diagram of a discharge excitation gas laser apparatus in accordance with another embodiment of the invention.
Figure 13:
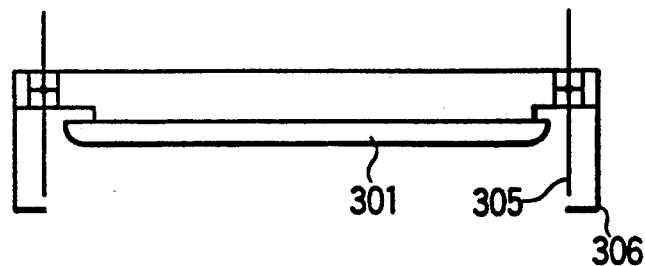
FIG. 13 depicts a construction of electrodes for a conventional discharge excitation gas laser apparatus.
Figure 14:
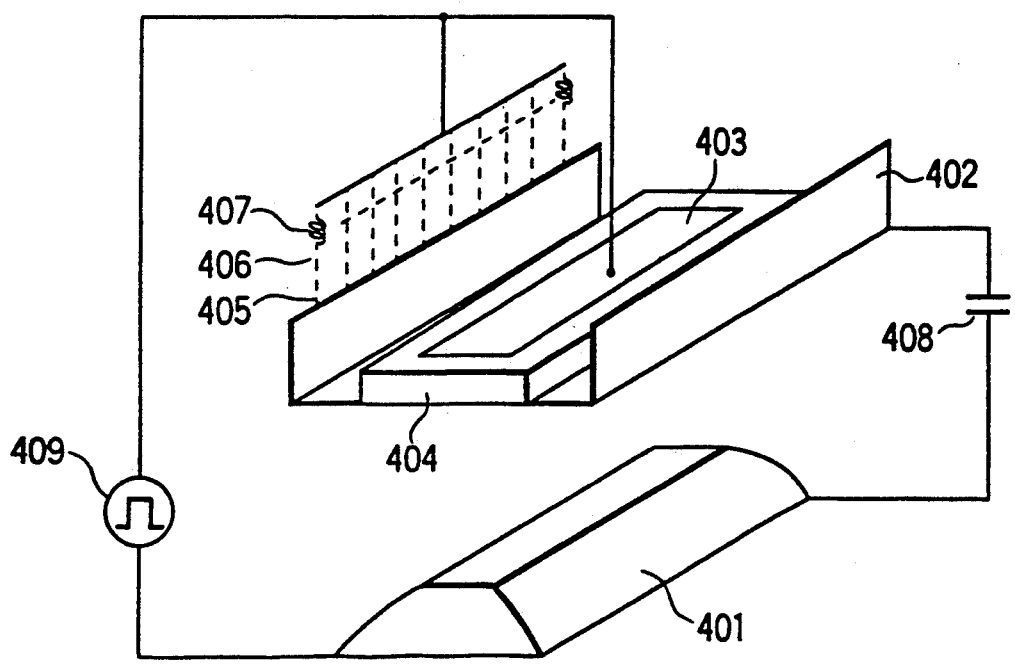
FIG. 14 is a schematic perspective view of another conventional discharge excitation gas laser apparatus.
Figure 15:
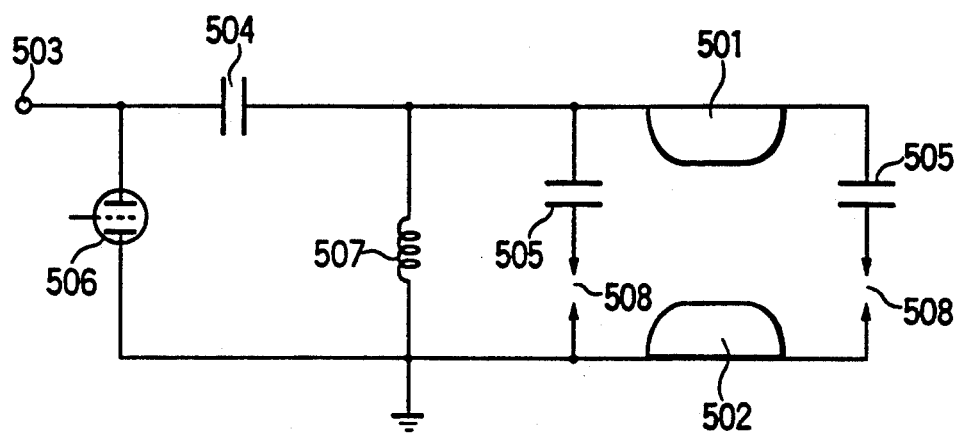
FIG. 15 is a circuit diagram of an excitation circuit of a further conventional discharge excitation laser apparatus.
Figure 16:
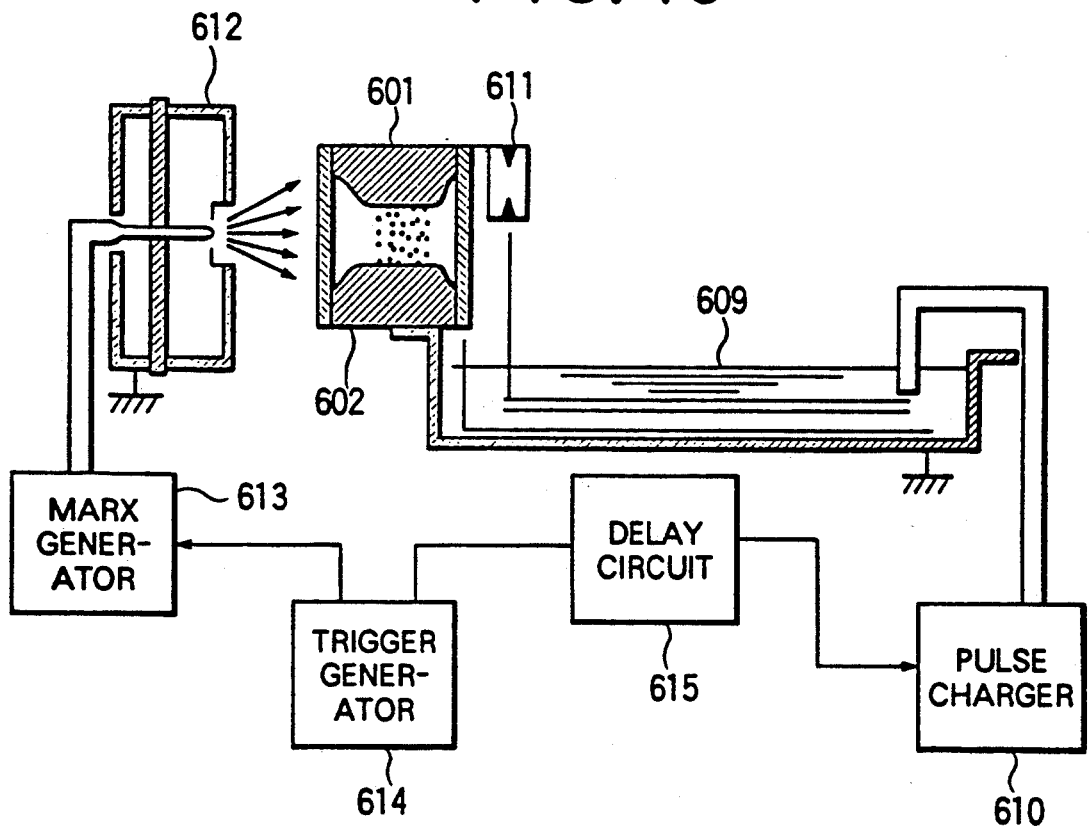
FIG. 16 is a schematic block diagram of a yet further conventional discharge excitation laser apparatus.
Figure 17:
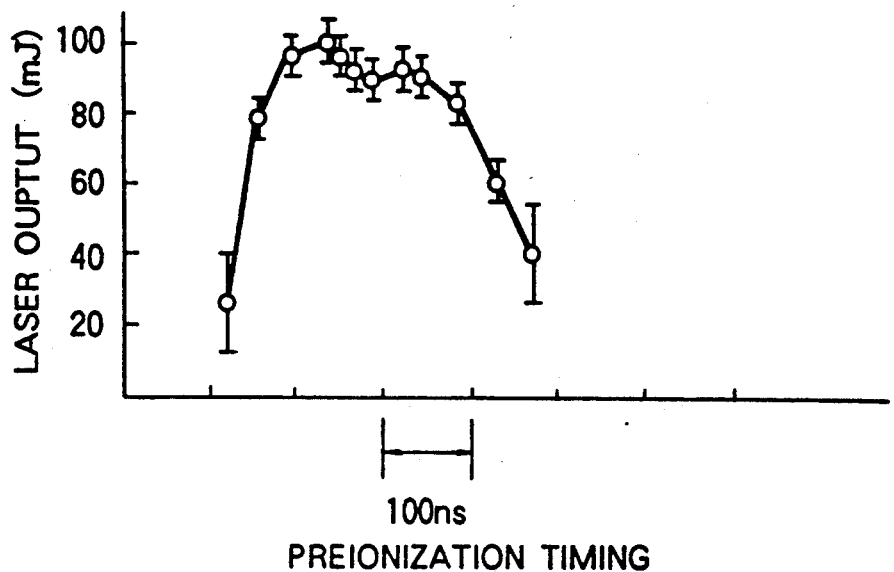
FIG. 17 is a graphical representation showing a relation between the laser output and the preionization timing.
Figure 18:
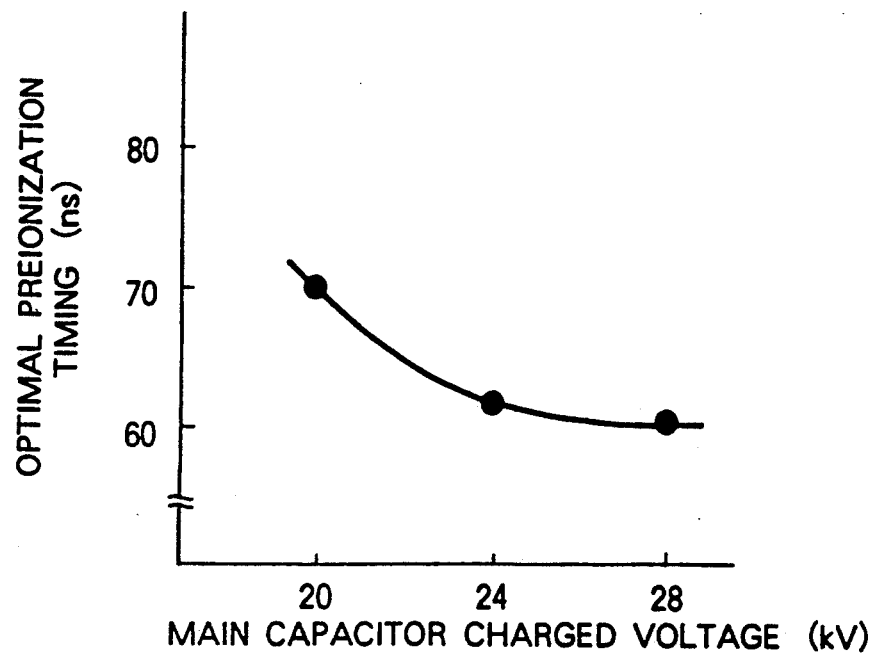
FIG. 18 is a graphical representation showing a relation between the optimal preionization timing and the main capacitor charging voltage.
Figure 19:
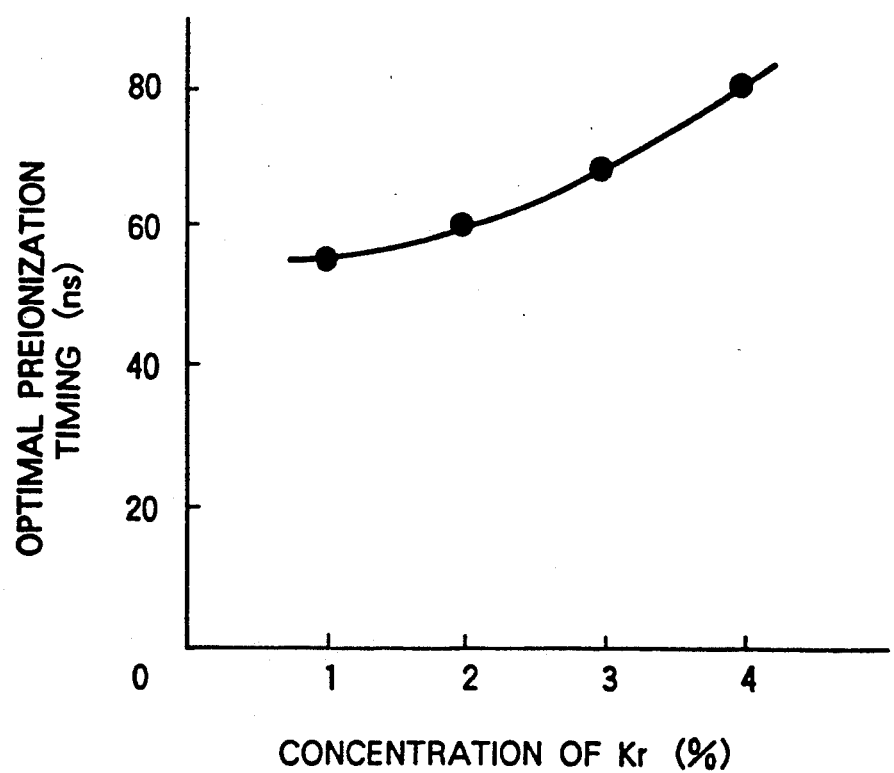
FIG. 19 is a graphical representation showing a relation between the optimal preionization timing and the concentration of krypton.

FIG. 12 illustrates a further embodiment of the invention. This embodiment is substantially similar to the previous embodiment of FIG. 10 except for the following. Namely, a current sensor 125 is connected to a current supply path, through which a current is supplied to a main ionization circuit 120, for sensing a current supplied to the main ionization circuit 120 and generating a corresponding signal. A first pulse generator 126 is connected to a voltage sensor 123 so that it is triggered by an output signal from the voltage sensor 123 to generate a pulse which is fed to a time/wave-height converter 128. A second pulse generator 127 is triggered by an output signal from the current sensor 125 for generating a pulse which is also fed to the time/wave-height converter 128. The time/wave-height converter 128 receives the output pulses from the first and second pulse generators 126, 127 for converting an interval between successive two pulses into a corresponding pulse height which is fed to the delay time determiner 121. In this embodiment, the voltage sensor 123 senses the start of applying a voltage between the first and second primary electrodes 101, 102 and generates a corresponding signal to the first pulse generator 126. This pulse is thereby triggered to generate a pulse. This pulse is input to the converter 128 as an operation starting signal. Also, the current sensor 125 senses the start of supplying a current to the main ionization circuit 120 and generates a corresponding signal to the second pulse generator 127, which is thereby triggered to generate a pulse that is input to the converter 128 as an operation terminating signal. Thus, based on the output pulses from the first and second pulse generators 126, 127, the converter 128 generates a pulse with a pulse height corresponding to a length of time required from the start of applying a voltage between the first and second primary electrodes 101, 102 until the start of discharging therebetween. Accordingly, the pulse generated by the converter 128 is input to the delay time determiner 124 where it is treated or processed in the same manner as the output signal from the voltage sensor 123 in the embodiment of FIG. 10, while providing substantially the same results. That is, the delay time determiner 124 first determines an appropriate reference delay time. Then, based on the output pulse from the converter 128, the delay time determiner 124 senses a first delay time lasting from the start of a first voltage application to the first and second primary electrodes 101, 102 until the start of a first discharge therebetween. It then adds a predetermined value to the first delay time, as sensed above to provide a new delay time. Subsequently, a new or second delay time is sensed and compared with the previous or first delay time. If the first delay time is equal to or less than the second delay time, then the predetermined value is added to the second delay time to provide a new delay time. If it is otherwise, the second delay time is decreased by the predetermined value to provide a new delay time. Then, a third delay time is sensed and compared with the second delay time. If the second delay time is equal to or less than the third delay time, then the third delay time is increased by the predetermined value, whereas if otherwise, the third delay time is decreased by the predetermined delay time. The above process steps are repeated as necessary.

Although in the flow chart of FIG. 11, preionization timing is controlled for each pulse from the voltage sensor 123, a proper number of pulses from the voltage sensor 123 can be grouped into a set of pulses so that discharge starting voltages for a set of pulses can be averaged to provide a stable discharge starting voltage over the set of pulses, preionization timing can still be is controlled with substantially the same results as in the flow chart of FIG. 11. In this case, moreover, variations in the discharge starting voltage for respective pulses can be substantially eliminated to provide more stable operation of the apparatus. This can be equally applied to the case in which the time required from the start of applying a voltage to the primary electrodes 101, 102 until the start of discharge therebetween is utilized in place of the discharge starting voltage between the primary electrodes.

What is claimed is:

1. A discharge excitation laser apparatus comprising:
   a pair of first and second primary electrodes disposed in a spaced opposed relation with respect to each other and having a main discharge space defined therebetween;
   excitation means connected to said first and second primary electrodes for causing a main discharge therebetween to thereby generate laser oscillations of a laser gas in the main discharge space between said first and second primary electrodes; and
   preionization means disposed behind said second primary electrode in relation to the main discharge space, said preionization means being provided for preionizing the laser gas in the main discharge space prior to the main discharge between said first and second primary electrodes, and said preionization means comprising at least two different types of preionization systems, said preionization systems generating a substantially uniform region and a high density region of preionized electrons in the main discharge space.

2. A discharge excitation laser apparatus according to claim 1, wherein said preionization means further comprises a preionization circuit and an excitation circuit
   said preionization circuit having a switch for starting preionization connected to at least one of said preionization systems,
   said preionization circuit being independent of said excitation circuit, and
   said excitation circuit being connected being connected to said excitation means for driving said excitation means, a triggering time of said excitation circuit and a triggering time of said preionization circuit being respectively adjusted by adjusting means to provide a substantially optimal discharge timing and a substantially optimal preionization timing.

3. A discharge excitation laser apparatus according to claim 1, wherein said preionization means comprises a corona preionization system and a UV spark preionization system.

4. A discharge excitation laser apparatus according to claim 3, wherein said corona preionization system comprises: said second primary electrode formed of flat metal board and having a plurality of through holes formed therethrough; an auxiliary electrode disposed behind said second primary electrode in a spaced opposed relation with respect to said second primary electrode; and a dielectric member sandwiched by said second primary electrode and said auxiliary electrode.

5. A discharge excitation laser apparatus according to claim 4, wherein said dielectric member has a planar configuration and a channel-shaped cross section.

6. A discharge excitation laser apparatus according to claim 4, wherein said dielectric member is of a substantially cylindrical configuration with said auxiliary electrode disposed therein.

7. A discharge excitation laser apparatus according to claim 6, wherein said cylindrical-shaped dielectric member has a portion of its outer peripheral surface cut away to provide a flat surface which is disposed in a face-to-face relation with respect to an area of said second primary electrode in which said throughholes are formed.

8. A discharge excitation laser apparatus according to claim 3 wherein said UV spark preionization system comprises a plurality of pin electrodes displaced behind said second primary electrode on opposite sides of an area thereof in which a plurality of throughholes are formed, said second primary electrode having a plurality of apertures formed therethrough in a face-to-face relation with respect to corresponding ones of said pin electrodes.

9. A discharge excitation laser apparatus laser apparatus according to claim 1, wherein said preionization means comprises an X-ray preionization system and a UV spark preionization system.

10. A discharge excitation laser apparatus according to claim 9, wherein said x-ray preionization system comprises an X-ray generator disposed behind said second primary electrode for generating X rays to the main discharge space between said first and second primary electrodes through said second primary electrode, said second primary electrode having a thin wall facing the main discharge space for permitting the passage therethrough of the X rays generated by said X-ray generator.

11. A discharge excitation gas laser apparatus according to claim 10, wherein said UV spark preionization system comprises a plurality of pin electrodes disposed substantially behind said second primary electrode on opposite sides thereof, said pin electrodes having tip ends directed toward the sides of said second primary electrode.

12. A discharge excitation laser apparatus according to claim 1, wherein said preionization means comprises an X-ray preionization system and a corona preionization system.

13. A discharge excitation laser apparatus comprising:

a pair of first and second primary electrodes disposed in, a spaced opposed relation with respect to each other and having a main discharge spaced defined therebetween;

an excitation circuit connected to said first and second primary electrodes for causing a main discharge therebetween to thereby generate laser oscillations of a laser gas in the main discharge space;

preionization means for preionizing the laser gas in the main discharge space prior to the main discharge between said first and second primary electrodes; and preionization timing setting means for setting a time when preionization is triggered including a means for establishing a minimum discharge starting voltage between said first and second primary electrodes, and a means for using the established voltage to determine the preionization trigger time.

14. A discharge excitation laser apparatus according to claim 13, wherein said preionization timing setting means monitors a discharge starting voltage at which the main discharge between said first and second primary electrodes begins to take place, and substantially optimizes the preioninzation timing on the basis of the discharge starting voltage thus monitored.

15. A discharge excitation laser apparatus comprising:

a pair of first and second primary electrodes disposed in a spaced opposed relation with respect to each other and having a main discharge spaced defined therebetween;

an excitation circuit connected to said first and second primary electrodes for causing a main discharge therebetween to thereby generate laser oscillations of a laser gas in the main discharge space;

preionization means for preionizing the laser gas in the main discharge space prior to the main discharge between said first and second primary electrodes; and preionization timing setting means for setting a time when preionization is triggered including a means for establishing a minimum time between the time a high voltage is applied between said first and second primary electrodes and the time the main discharge starts, and a means for using the established time to determine the preionization trigger time.

16. A discharge excitation laser apparatus according to claim 15 wherein said preionization timing setting means monitors a length of time from the time a high voltage is applied between said first and second primary electrodes until the time the main discharge therebetween starts, and substantially optimizes the preionization timing on the basis of the length of time thus monitored.

* * * * *